US012055119B2

(12) United States Patent
Kaneta et al.

(10) Patent No.: US 12,055,119 B2
(45) Date of Patent: Aug. 6, 2024

(54) FUEL INJECTION VALVE

(71) Applicant: DENSO CORPORATION, Kariya (JP)

(72) Inventors: Hiroki Kaneta, Kariya (JP); Hajime Kataoka, Nisshin (JP); Masayuki Niwa, Nisshin (JP); Noritsugu Katou, Kariya (JP); Yousuke Nakagawa, Kariya (JP); Masahiro Ookuma, Kariya (JP); Sao Yoshidome, Obu (JP); Gen Takai, Obu (JP)

(73) Assignee: DENSO CORPORATION, Kariya (JP)

( * ) Notice: Subject to any disclaimer, the term of this patent is extended or adjusted under 35 U.S.C. 154(b) by 371 days.

(21) Appl. No.: 17/554,622

(22) Filed: Dec. 17, 2021

(65) Prior Publication Data

US 2022/0106935 A1 Apr. 7, 2022

Related U.S. Application Data

(63) Continuation of application No. PCT/JP2020/023574, filed on Jun. 16, 2020.

(30) Foreign Application Priority Data

Jun. 20, 2019 (JP) ................................ 2019-114738

(51) Int. Cl.
*F02M 61/18* (2006.01)

(52) U.S. Cl.
CPC .................................. *F02M 61/18* (2013.01)

(58) Field of Classification Search
CPC .... F02M 61/1846; F02M 61/10; F02M 61/18; F02M 61/1873; F02M 61/1886; F02M 61/184; F02M 61/1833; F02M 61/1806; F02M 2200/06
See application file for complete search history.

(56) References Cited

U.S. PATENT DOCUMENTS

| | | | | |
|---|---|---|---|---|
| 2018/0202405 | A1 * | 7/2018 | Kato | F02M 61/184 |
| 2019/0345907 | A1 | 11/2019 | Kato | |

FOREIGN PATENT DOCUMENTS

| | | |
|---|---|---|
| DE | 10 2011 007 885 | 10/2012 |
| JP | 2007-327501 | 12/2007 |
| JP | 5772495 | 9/2015 |
| JP | 2015-172357 | 10/2015 |
| JP | 5812050 | 10/2015 |
| JP | 2017-2876 | 1/2017 |

* cited by examiner

*Primary Examiner* — Christopher R Dandridge
(74) *Attorney, Agent, or Firm* — Nixon & Vanderhye P.C.

(57) ABSTRACT

At least one of nozzle holes is provided as a non-circular nozzle hole where the ratio of the longest diameter to the shortest diameter of an outlet opening portion is greater than 1. A virtual non-circular cone and a virtual circular cone are defined for each of the non-circular nozzle hole and a circular nozzle hole where the ratio of the longest diameter to the shortest diameter of the outlet opening portion is 1. At least two adjacent nozzle holes are formed such that the virtual non-circular cone does not interfere with the virtual circular cone or the virtual non-circular cone.

5 Claims, 32 Drawing Sheets

FUEL INJECTION VALVE

CROSS REFERENCE TO RELATED APPLICATION

The present application is a continuation application of International Patent Application No. PCT/JP2020/023574 filed on Jun. 16, 2020, which designated the U.S. and claims the benefit of priority from Japanese Patent Application No. 2019-114738 filed on Jun. 20, 2019. The entire disclosures of all of the above applications are incorporated herein by reference.

TECHNICAL FIELD

The present disclosure relates to a fuel injection valve.

BACKGROUND

Conventionally, a known fuel injection valve is required to suppress accumulation of deposit on a nozzle hole inner wall and suppress chronological changes in fuel injection characteristics.

SUMMARY

A fuel injection valve according to a first aspect of the present disclosure comprises a nozzle, a needle, and a drive unit. The nozzle that includes a nozzle cylinder portion forming a fuel passage therein, a nozzle bottom portion closing one end of the nozzle cylinder portion, a plurality of nozzle holes connecting a surface of the nozzle bottom portion on a side of the nozzle cylinder portion with a surface on an opposite side from the nozzle cylinder portion to inject fuel in the fuel passage, and an annular valve seat formed around the nozzle holes on a surface of the nozzle bottom portion on the side of the nozzle cylinder portion.

The needle that is reciprocally movable inside the nozzle, the needle configured to contact with the valve seat to close the nozzle hole and to separate from the valve seat to open the nozzle hole. The drive unit is configured to move the needle in one of a valve opening direction and a valve closing direction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
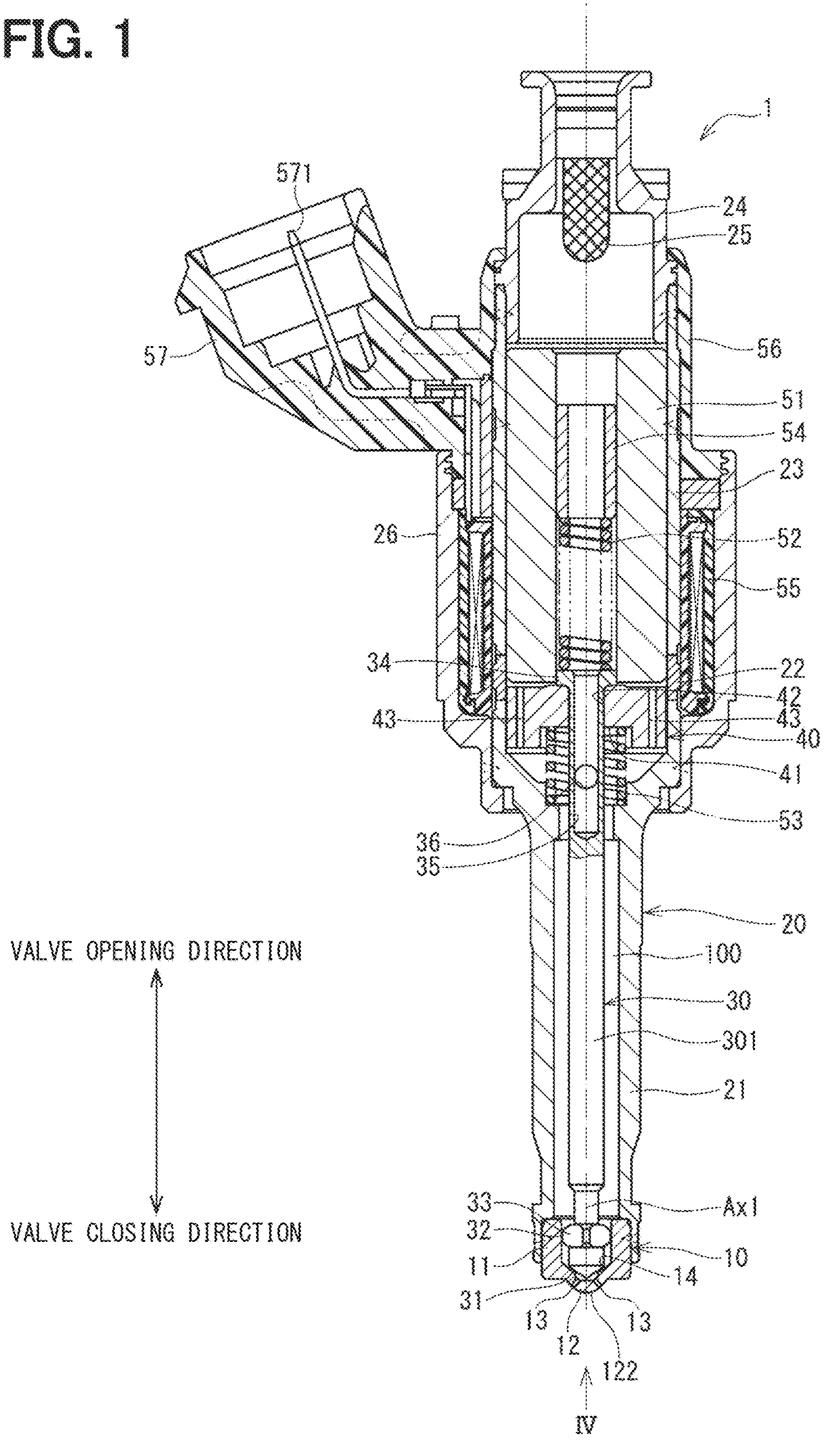
FIG. 1 is a sectional view illustrating a fuel injection valve according to a first embodiment.

As follows, examples of the present disclosure will be described.

According to an example of the present disclosure, a fuel injection valve has a nozzle hole that is flattened in the cross-sectional shape to decrease the area of a part of the nozzle hole inner wall where no fuel flows in order to suppress the accumulation of deposit on a nozzle hole inner wall and suppress chronological changes in fuel injection characteristics.

It is noted that, an issue caused by the interference between sprays injected from multiple nozzle holes may be considered. The interference between fuel sprays may form a closed space to generate negative pressure and prevent air intake. The fuel sprays may shrink and coalesce. Therefore, there is a risk that the increased penetration wets the inside of the cylinder and degrades the spraying characteristics.

A fuel injection valve according to an example of the present disclosure comprises a nozzle, a needle, and a drive unit. The nozzle that includes a nozzle cylinder portion forming a fuel passage therein, a nozzle bottom portion closing one end of the nozzle cylinder portion, a plurality of nozzle holes connecting a surface of the nozzle bottom portion on a side of the nozzle cylinder portion with a surface on an opposite side from the nozzle cylinder portion to inject fuel in the fuel passage, and an annular valve seat formed around the nozzle holes on a surface of the nozzle bottom portion on the side of the nozzle cylinder portion.

The needle that is reciprocally movable inside the nozzle, the needle configured to contact with the valve seat to close the nozzle hole and to separate from the valve seat to open the nozzle hole. The drive unit is configured to move the needle in one of a valve opening direction and a valve closing direction.

A nozzle hole of the nozzle holes includes an inlet opening portion formed on the surface of the nozzle bottom portion on the side of the nozzle cylinder portion, an outlet opening portion formed on the surface of the nozzle bottom portion on the opposite side from the nozzle cylinder portion, and a nozzle hole inner wall connecting the inlet opening portion with the outlet opening portion. An area of the outlet opening portion is larger than an area of the inlet opening portion. At least one of the nozzle holes is a non-circular nozzle hole in which a ratio of a longest diameter to a shortest diameter of the outlet opening portion is greater than 1.

$\theta$ (deg) is a nozzle hole open angle of a circular nozzle hole that belongs to the nozzle holes and in which the ratio of the longest diameter to the shortest diameter of the outlet opening portion is equal to 1. $\theta f$ (deg) is a spray open angle of fuel to be injected from the circular nozzle hole. P (MPa) is an average pressure of fuel in the fuel passage when fuel is injected from the circular nozzle hole.

A virtual circular cone is defined as a virtual cone having a vertex, which is an intersection point between a nozzle hole axis of the circular nozzle hole and the outlet opening portion, and two generatrices, which are in a cross-section along a first virtual plane including the nozzle hole axis of the circular nozzle hole, forming $\theta f=\theta+0.5\times P\hat{}0.6$ as an angle therebetween.

$\theta 1$ (deg) is the largest nozzle hole open angle of the non-circular nozzle hole. $\theta 2$ (deg) is the smallest nozzle hole open angle. $\theta f1$ (deg) is the largest open angle of a fuel spray injected from the non-circular nozzle hole. $\theta f2$ (deg) is the smallest open angle of a fuel spray injected from the non-circular nozzle hole.

A virtual non-circular cone is defined as a virtual cone having a vertex, which is an intersection point between the nozzle hole axis of the non-circular nozzle hole and the outlet opening portion, and two generatrices, which are in a cross-section along a second virtual plane including the nozzle hole axis of the non-circular nozzle hole, forming $\theta f1=\theta 1+0.5\times P\hat{}0.6+17\times e\hat{}(-0.13\times\theta 1)$ as a largest angle therebetween.

The virtual non-circular cone has two generatrices, which are in a cross-section along a third virtual plane that includes the nozzle hole axis of the non-circular nozzle hole and intersects with the second virtual plane, forming $\theta f2=\theta 2+0.5\times P\hat{}0.6$ as a smallest angle therebetween. At least two of the nozzle holes, which are adjacent to each other, are formed such that the virtual non-circular cone does not interfere with one of the virtual circular cone and the virtual non-circular cone.

The present disclosure uses one or more of the nozzle holes as non-circular nozzle holes where the ratio of the longest diameter to the shortest diameter of the outlet opening portion is greater than 1. Thereby, it is possible to inhibit deposit from accumulating on the nozzle hole inner wall.

A virtual non-circular cone and a virtual circular cone are defined for the non-circular nozzle hole and the circular nozzle hole each. At least two adjacent nozzle holes are formed such that the virtual non-circular cone does not interfere with the virtual circular cone or the virtual non-circular cone. It is possible to inhibit interference between fuel sprays injected from the nozzle holes. No closed space is formed between fuel sprays. The air can be taken with no negative pressure generated. It is possible to inhibit fuel sprays from being shrunk and coalesced with each other. It is possible to inhibit an increased spray penetration from wetting inside the cylinder and deteriorating the spraying characteristics.

A fuel injection valve according to an example of the present disclosure, the nozzle holes are non-circular nozzle holes in which a ratio of a longest diameter to a shortest diameter of the outlet opening portion is greater than 1.

$\theta 1$ (deg) is the largest nozzle hole open angle of the non-circular nozzle hole. $\theta 2$ (deg) is the smallest nozzle hole open angle. $\theta f1$ (deg) is the largest open angle of a fuel spray injected from the non-circular nozzle hole. $\theta f2$ (deg) is the smallest open angle of a fuel spray injected from the non-circular nozzle hole.

A virtual non-circular cone is defined as a virtual cone having a vertex, which is an intersection point between the nozzle hole axis of the non-circular nozzle hole and the outlet opening portion, two generatrices, which are in a cross-section along a second virtual plane including the nozzle hole axis of the non-circular nozzle hole, forming $\theta f1=\theta 1+0.5\times P\hat{}0.6+17\times e\hat{}(-0.13\times\theta 1)$ as a largest angle therebetween.

The virtual non-circular cone has two generatrices, which are in a cross-section along a third virtual plane that includes the nozzle hole axis of the non-circular nozzle hole and intersects with the second virtual plane, forming $\theta f2=\theta 2+0.5\times P\hat{}0.6$ as a smallest angle therebetween. At least two of the nozzle holes, which are adjacent to each other, are formed such that the virtual non-circular cone does not interfere with the virtual non-circular cone.

This example can also inhibit an increased spray penetration from wetting inside the cylinder and deteriorating the spraying characteristics.

Embodiments of the fuel injection valve will be described based on the accompanying drawings. In the embodiments, substantially the same configuration parts are depicted by the same reference numerals and a detailed description is omitted for simplicity. In the embodiments, substantially the same configuration parts provide the same or similar function effects.

First Embodiment

FIG. 1 illustrates the fuel injection valve according to the first embodiment. A fuel injection valve 1 is used for a gasoline engine (hereinafter simply referred to as "engine") 80 as an internal combustion engine, for example. The fuel injection valve 1 injects gasoline as fuel and supplies it to the engine 80 (see FIG. 2).

Figure 2:
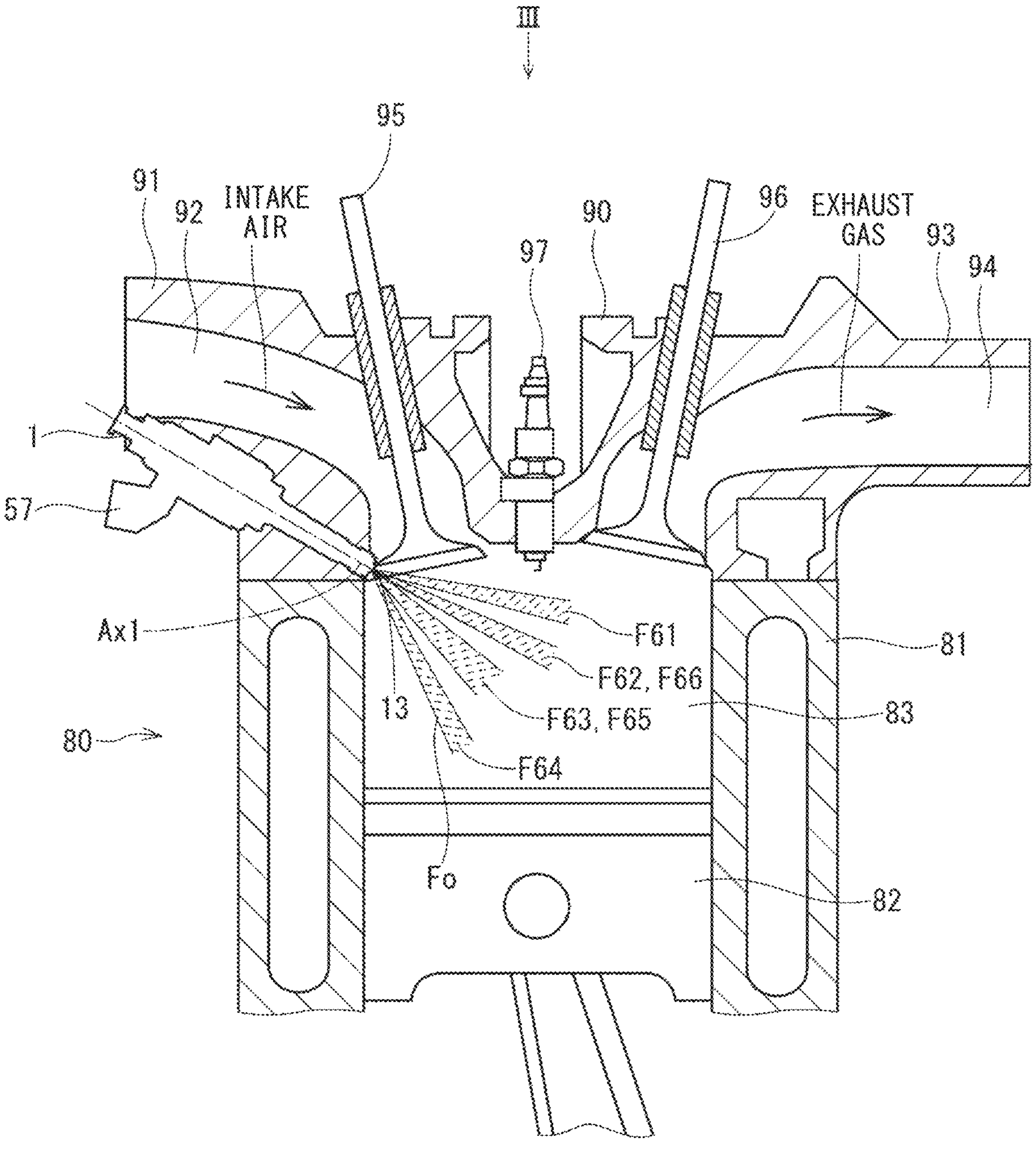
FIG. 2 is a diagram illustrating a state where the fuel injection valve according to the first embodiment is used for an internal combustion engine.

As illustrated in FIG. 2, the engine 80 includes a cylindrical cylinder block 81, a piston 82, a cylinder head 90, an intake valve 95, and an exhaust valve 96, for example. The piston 82 is provided in the cylinder block 81 to be able to reciprocate. The cylinder head 90 is provided to close an open end of the cylinder block 81. A combustion chamber 83 is formed among an inner wall of the cylinder block 81, a wall surface of the cylinder head 90, and the piston 82. The volume of the combustion chamber 83 increases or decreases in proportion as the piston 82 reciprocates.

The cylinder head 90 includes an intake manifold 91 and an exhaust manifold 93. An intake passage 92 is formed in the intake manifold 91. One end of the intake passage 92 is open to the atmosphere, and the other end is connected to the combustion chamber 83. The intake passage 92 guides the air (hereinafter referred to as "intake air") taken from the atmosphere to the combustion chamber 83.

An exhaust passage 94 is formed in the exhaust manifold 93. One end of the exhaust passage 94 is connected to the combustion chamber 83, and the other end is open to the atmosphere. The exhaust passage 94 guides the air (hereinafter referred to as "exhaust gas") containing the combustion gas generated in the combustion chamber 83 to the atmosphere.

The intake valve 95 is provided for the cylinder head 90 to be able to reciprocate based on the rotation of a cam of a driven shaft that rotates in conjunction with a drive shaft (unshown). The intake valve 95 reciprocates to be able to open and close between the combustion chamber 83 and the intake passage 92. The exhaust valve 96 is provided for the cylinder head 90 to be able to reciprocate based on the rotation of the cam. The exhaust valve 96 reciprocates to be able to open and close between the combustion chamber 83 and the exhaust passage 94.

According to the present embodiment, the fuel injection valve 1 is mounted on the cylinder block 81 toward the intake passage 92 of the intake manifold 91. The fuel injection valve 1 is provided such that its centerline tilts or twists against the centerline of the combustion chamber 83. The centerline of the combustion chamber 83 corresponds to the axis of the combustion chamber 83 and coincides with the axis of the cylinder block 81. According to the present embodiment, the fuel injection valve 1 is provided on the side of the combustion chamber 83. Namely, the fuel injection valve 1 is sideways installed on the engine 80 for practical use.

A spark plug 97 is provided as an ignition device between the intake valve 95 and the exhaust valve 96 of the cylinder head 90, namely, at a position corresponding to the center of the combustion chamber 83. The spark plug 97 is provided at a position capable of avoiding direct adhesion of the fuel injected from the fuel injection valve 1 and igniting the air-fuel mixture (combustible air), a mixture of the fuel and intake air. The engine 80 is provided as a direct injection type gasoline engine.

The fuel injection valve 1 is provided such that the multiple nozzle holes 13 are exposed radially outside the combustion chamber 83 in the radial direction. The fuel injection valve 1 is supplied with the fuel pressurized by a fuel pump (unshown) to be comparable to a fuel injection pressure. Conical fuel spray Fo is injected into the combustion chamber 83 from the multiple injection holes 13 of the fuel injection valve 1.

Figure 3:
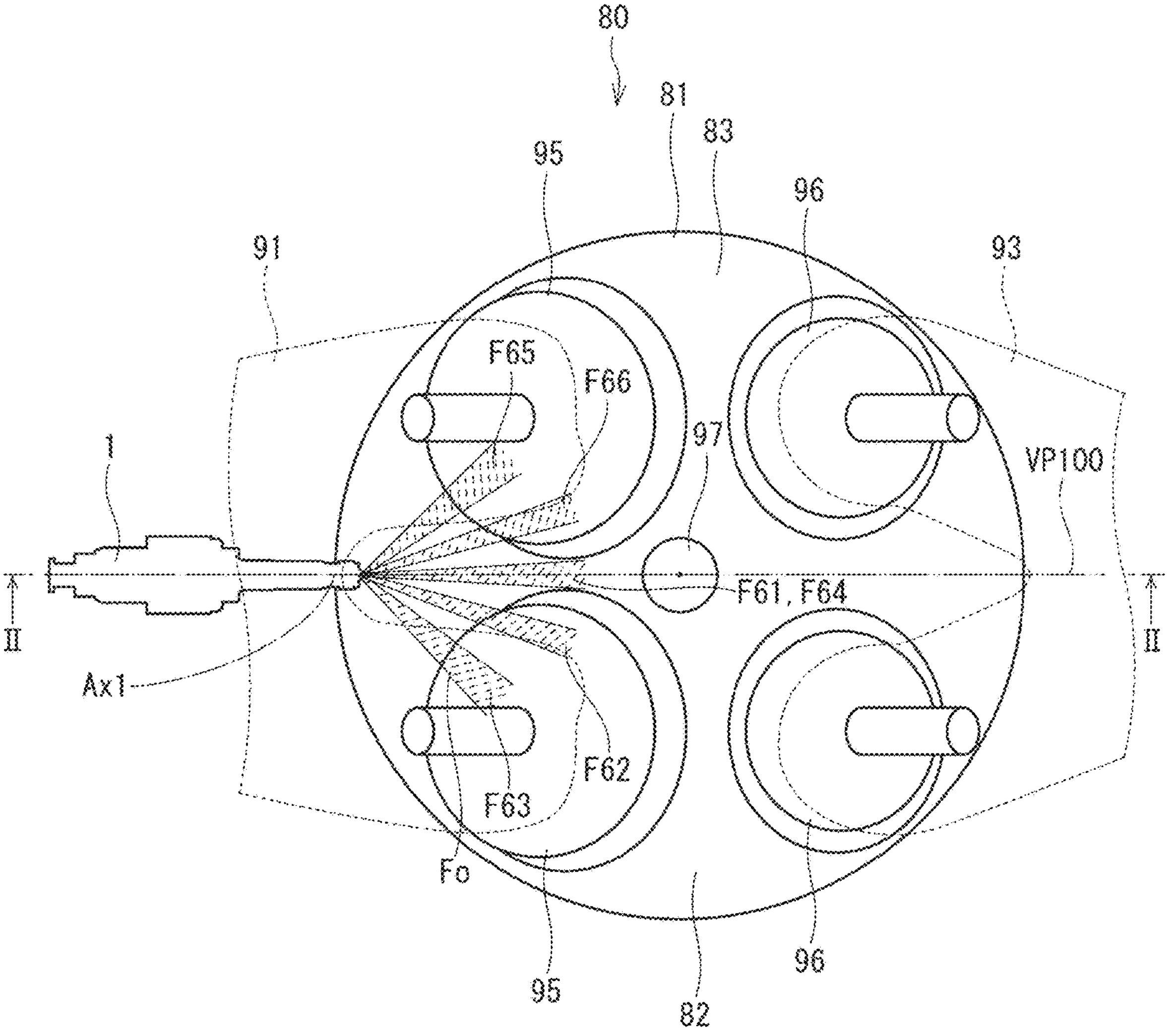
FIG. 3 is a diagram illustrating FIG. 2 viewed in the direction of arrow III.

As illustrated in FIG. 3, the engine 80 according to the present embodiment is provided with two intake valves 95 and two exhaust valves 96. The two intake valves 95 are provided at the two branched ends of the intake manifold 91 toward the cylinder block 81. The two exhaust valves 96 are provided at the two branched ends of the exhaust manifold 93 toward the cylinder block 81. The fuel injection valve 1 is provided for the intake manifold 91 such that the centerline coincides with virtual plane VP100 that passes between the two intake valves 95 and between the two exhaust valves 96 including the axis of the cylinder block 81.

The description below explains a basic configuration of the fuel injection valve 1 based on FIG. 1.

The fuel injection valve 1 includes a nozzle 10, a housing 20, a needle 30, a moving core 40, a fixed core 51, a spring 52 as a pressure-applying member at the valve seat, a spring 53 as a pressure-applying member at the fixed core, and a coil 55 as a drive unit, for example.

Figure 4:
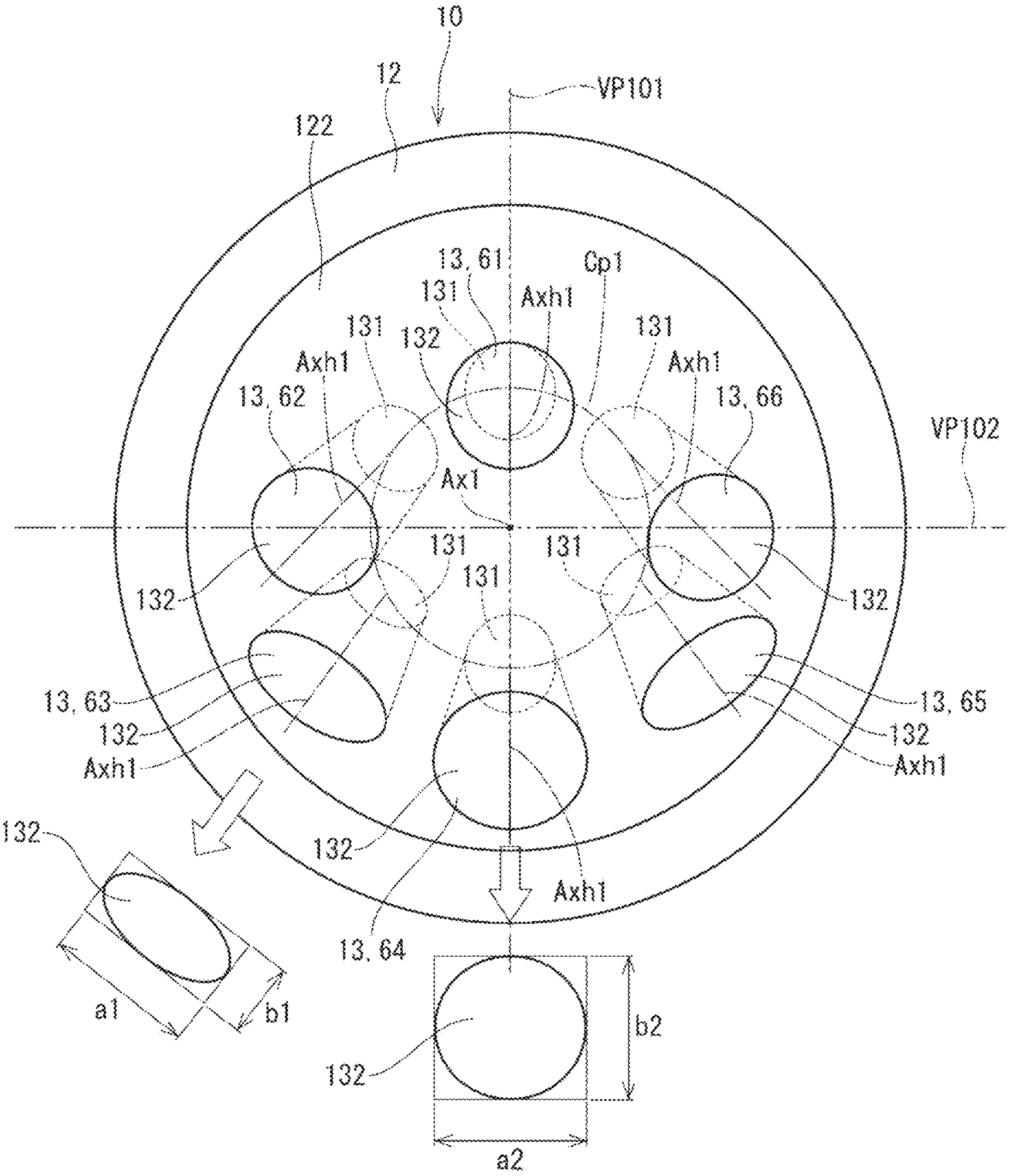
FIG. 4 is a diagram illustrating FIG. 1 viewed in the direction of arrow IV.
Figure 5:
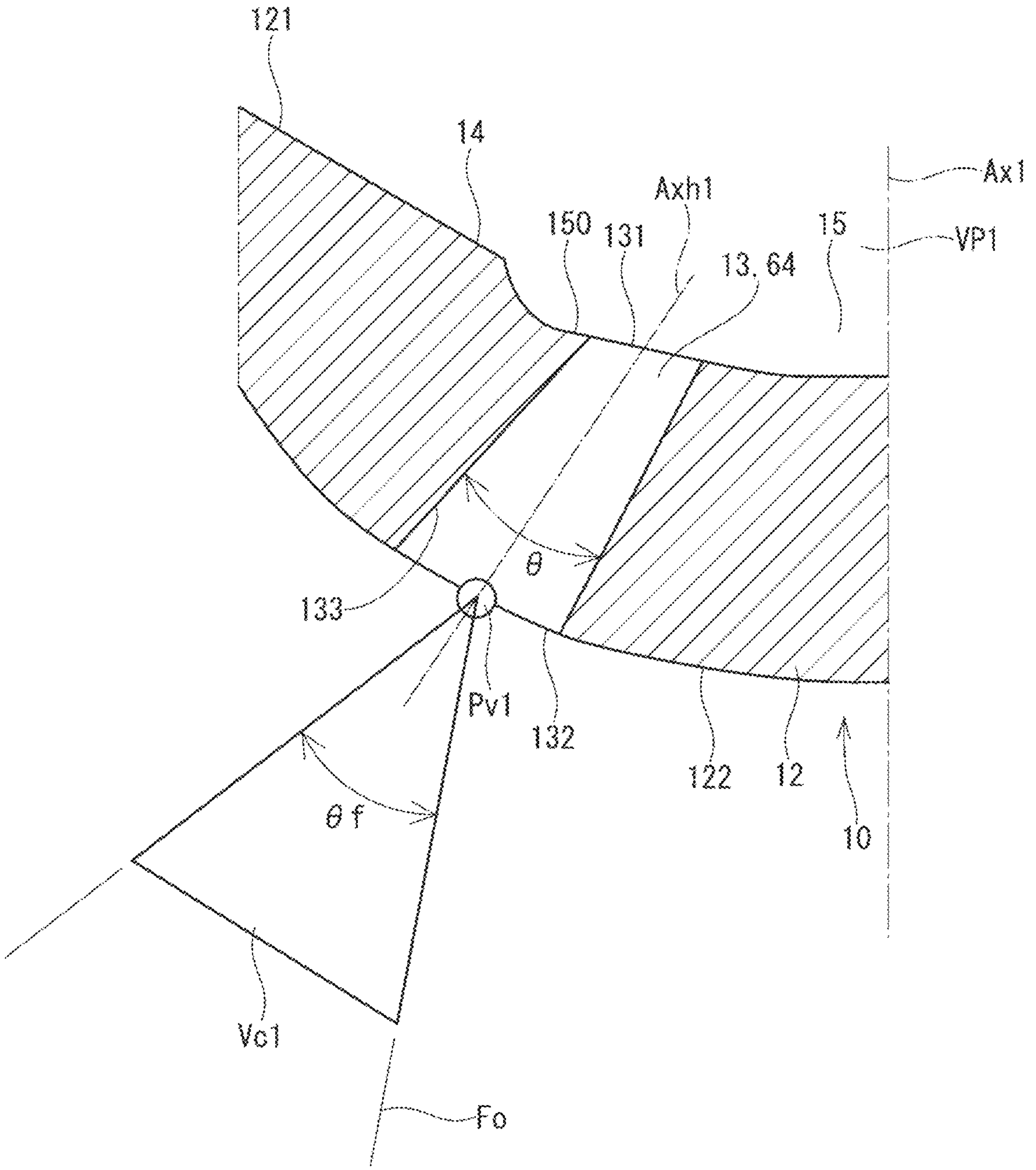
FIG. 5 is a sectional view including a circular nozzle hole of the fuel injection valve according to the first embodiment.

The nozzle 10 is made of a metal such as martensitic stainless steel. The nozzle 10 is hardened to satisfy a predetermined hardness. As illustrated in FIGS. 1, 4, and 5, the nozzle 10 includes a nozzle cylinder portion 11, a nozzle bottom portion 12, a nozzle hole 13, and a valve seat 14, for example.

The nozzle cylinder portion 11 is formed into an approximately cylindrical shape. The nozzle bottom portion 12 closes one end of the nozzle cylinder portion 11. The nozzle hole 13 is formed to connect the surface or the inner wall of the nozzle bottom portion 12 on the side of the nozzle cylinder portion 11 with a surface 122 opposite from the nozzle cylinder portion 11 (see FIG. 5). Multiple nozzle holes 13 are formed in the nozzle bottom portion 12. The present embodiment forms six nozzle holes 13 (see FIG. 4). The valve seat 14 is annularly formed around the nozzle hole 13 on the surface of the nozzle bottom portion 12 on the side of the nozzle cylinder portion 11. The nozzle hole 13 will be described in detail later.

The housing 20 includes a first cylinder member 21, a second cylinder member 22, a third cylinder member 23, and an inlet portion 24, for example.

The first cylinder member 21, the second cylinder member 22, and the third cylinder member 23 are all formed into an approximately cylindrical shape. The first cylinder member 21, the second cylinder member 22, and the third cylinder member 23 are coaxially placed and mutually connected in the order of the first cylinder member 21, the second cylinder member 22, and the third cylinder member 23.

The first cylinder member 21 and the third cylinder member 23 are made of a magnetic material such as ferritic stainless steel and are magnetically stabilized. The second cylinder member 22 is made of a non-magnetic material such as austenitic stainless steel. The second cylinder member 22 functions as a magnetic flux adjustment portion.

The first cylinder member 21 is provided such that the inner wall at the end opposite from the second cylinder member 22 fits into the outer wall of the nozzle cylinder portion 11 of the nozzle 10. The inlet portion 24 is made of a magnetic material such as ferritic stainless steel and is formed into a cylindrical shape. The inlet portion 24 is provided such that one end is connected to the end portion of the third cylinder member 23 opposite from the second cylinder member 22.

A fuel passage 100 is formed inside the housing 20. The fuel passage 100 is connected to the nozzle hole 13. Namely, the fuel passage 100 is formed inside the nozzle cylinder portion 11 of the nozzle 10. A pipe (unshown) is connected to the inlet portion 24 opposite from the third cylinder member 23. The fuel from a fuel supply source (fuel pump) flows into the fuel passage 100 via the pipe. The fuel passage 100 guides the fuel to the nozzle hole 13.

A filter 25 is provided inside the inlet portion 24. The filter 25 collects foreign matters in the fuel flowing into the fuel passage 100. The maximum diameter of a particle passing through the filter 25 may be smaller than the gap between a needle body 301 and a suction wall surface 150 in the valve axial direction when the valve is closed.

The needle 30 is made of a metal such as martensitic stainless steel and is formed into a rod shape. The needle 30 is hardened to satisfy a predetermined hardness.

The needle 30 is contained in the housing 20 to be able to reciprocate in the fuel passage 100 in the axial direction of the housing 20. The needle 30 includes a needle body 301, a seat portion 31, a large-diameter portion 32, and a flange portion 34, for example.

The needle body 301 is formed into a rod shape. The seat portion 31 is formed at the end of the needle body 301 toward the nozzle 10 and can contact with the valve seat 14.

The large-diameter portion 32 is formed near the seat portion 31 at the end of the needle body 301 toward the valve seat 14. The large-diameter portion 32 is configured such that the outer diameter is larger than the outer diameter of the needle body 301 at the end toward the valve seat 14. The large-diameter portion 32 is formed such that the outer wall slides on the inner wall of the nozzle cylinder portion 11 of the nozzle 10. Therefore, the needle 30 is guided to reciprocate in the axial direction at the end toward the valve seat 14. The large-diameter portion 32 is formed with a notched portion 33 such that the outer wall is notched at multiple locations in the circumferential direction. Therefore, the fuel can flow between the notched portion 33 and the inner wall of the nozzle cylinder portion 11.

The flange portion 34 is formed into an approximately cylindrical shape to extend radially outward from the end opposite from the seat portion 31 of the needle body 301.

The needle body 301 is formed with an axial hole portion 35 and a radial hole portion 36. The axial hole portion 35 is formed to extend in the axial direction from the end face of the needle body 301 opposite from the seat portion 31. The radial hole portion 36 is formed to extend in the radial direction of the needle body 301 and connect the axial hole portion 35 with the outer wall of the needle body 301. The fuel opposite from the nozzle 10 against the needle 30 can flow between the outer wall of the needle body 301 and the inner wall of the first cylinder member 21 via the axial hole portion 35 and the radial hole portion 36.

The needle 30 allows the seat portion 31 to separate from the valve seat 14 (unseated) or contact with the valve seat 14 (seated), thus opening and closing the nozzle hole 13. As appropriate, the direction to separate the needle 30 from the valve seat 14 is referred to as a valve opening direction. The direction to contact with the needle 30 with the valve seat 14 is referred to as a valve closing direction. The moving core 40 is made of a magnetic material such as ferritic stainless steel and is formed into a cylindrical shape. The moving core 40 is magnetically stabilized. The moving core 40 is provided inside the first cylinder member 21 and the second cylinder member 22 of the housing 20.

The moving core 40 is formed into an approximately columnar shape. The moving core 40 is formed with a concave portion 41, a shaft hole 42, and a through-hole 43.

The concave portion 41 is formed to be concaved from the center of the end face of the moving core 40 toward the nozzle 10 to the side opposite from the nozzle 10. The shaft hole 42 is formed to pass through the axis of the moving core 40 and connect the end face of the moving core 40 opposite from the nozzle 10 with the bottom face of the concave portion 41. The through-hole 43 is formed to connect the end face of the moving core 40 toward the nozzle 10 with the end face of the moving core 40 opposite from the nozzle 10.

Multiple through-holes 43 are evenly spaced in the circumferential direction of the moving core 40 radially outside the concave portion 41.

The moving core 40 is provided inside the housing 20 along with the needle body 301 inserted into the shaft hole 42. Namely, the moving core 40 is provided radially outside the needle body 301. The moving core 40 is axially movable relative to the needle body 301. The inner wall forming the shaft hole 42 of the moving core 40 is slidable on the outer wall of the needle body 301.

Opposite to the nozzle 10, the end face of the moving core 40 around shaft hole 42 can contact with or separate from the end face of the flange portion 34 toward the nozzle 10.

The fixed core 51 is made of a magnetic material such as ferritic stainless steel and is formed into an approximately cylindrical shape. The fixed core 51 is magnetically stabilized. The fixed core 51 is provided for the moving core 40 opposite from the nozzle 10. The fixed core 51 is provided inside the housing 20 such that the outer wall connects with the inner walls of the second cylinder member 22 and the third cylinder member 23. The end face of the fixed core 51 toward the nozzle 10 can contact with the end face of the moving core 40 toward the fixed core 51.

A cylindrical adjusting pipe 54 is press-fitted inside the fixed core 51. The spring 52 is available as a coil spring, for example, and is provided between the adjusting pipe 54 inside the fixed core 51 and the needle 30. One end of the spring 52 contacts with the adjusting pipe 54. The other end of the spring 52 contacts with the end faces of the needle body 301 and the flange portion 34 opposite from the nozzle 10. The spring 52 can press the moving core 40 together with the needle 30 toward the nozzle 10, namely, in the valve closing direction. A pressure-applying force of the spring 52 is adjusted according to the positions of the adjusting pipe 54 against the fixed core 51.

The coil 55 is formed into an approximately cylindrical shape and is provided to mainly surround radially outside the second cylinder member 22 and the third cylinder member 23 of the housing 20. A cylindrical holder 26 is provided radially outside the coil 55 to cover the coil 55. The holder 26 is made of a magnetic material such as ferritic stainless steel. The holder 26 allows the inner wall at one end to connect with the outer wall of the first cylinder member 21 and allows the inner wall at the other end to magnetically connect with the outer wall of the third cylinder member 23.

The coil 55 generates a magnetic force when electric power is supplied (energized). When the coil 55 generates a magnetic force, a magnetic circuit is formed on the moving core 40, the first cylinder member 21, the holder 26, the third cylinder member 23, and the fixed core 51 except the second cylinder member 22 as the magnetic flux adjustment portion. A magnetic attractive force is generated between the fixed core 51 and the moving core 40. The fixed core 51 attracts the moving core 40 along with the needle 30. The needle 30 moves in the valve opening direction. The seat portion 31 separates from the valve seat 14 to open the valve. The nozzle hole 13 is opened to inject the fuel from the nozzle hole 13. When energized, the coil 55 is capable of attracting the moving core 40 toward the fixed core 51 and moving the needle 30 opposite from the valve seat 14, namely, in the valve opening direction.

When the magnetic attractive force attracts the moving core 40 toward the fixed core 51 (valve opening direction), the flange portion 34 of the needle 30 moves axially inside the fixed core 51. At this time, the outer wall of the flange portion 34 slides on the inner wall of the fixed core 51. Therefore, the fixed core 51 guides the axial reciprocation of the needle 30 at the end toward the flange portion 34.

When the magnetic attractive force attracts the moving core 40 toward the fixed core 51 (valve opening direction), the end face of the moving core 40 toward the fixed core 51 collides with the end face of the fixed core 51 toward the moving core 40. Then, the moving core 40 is prevented from further moving in the valve opening direction.

When the power supply to the coil 55 stops while the moving core 40 is attracted toward the fixed core 51, the needle 30 and the moving core 40 are pressed toward the valve seat 14 due to a pressure-applying force of the spring 52. The needle 30 moves in the valve closing direction. The seat portion 31 contacts with the valve seat 14 to close the valve. Then, the nozzle hole 13 is closed.

The spring 53 is provided as a coil spring, for example, such that one end contacts with the bottom surface of the concave portion 41 of the moving core 40 and the other end contacts with a stepped surface of the inner wall of the first cylinder member 21 of the housing 20. The spring 53 can press the moving core 40 toward the fixed core 51, namely, in the valve opening direction. The spring 53 generates a pressure-applying force smaller than that of the spring 52. When the coil 55 is not energized, the spring 52 presses the seat portion 31 of the needle 30 against the valve seat 14. The spring 53 presses the moving core 40 against the flange portion 34.

As illustrated in FIG. 1, a mold portion 56 made of resin is provided radially outside the third cylinder member 23. A connector portion 57 is formed to protrude radially outward from the mold portion 56. A terminal 571 for supplying electric power to the coil 55 is insert-molded in the connector portion 57.

The fuel flowing from the inlet portion 24 passes through the filter 25, inside between the fixed core 51 and the adjusting pipe 54, the axial hole portion 35, the radial hole portion 36, between the needle 30 and the inner wall of the housing 20, between the needle 30 and the inner wall of the nozzle cylinder portion 11, namely, the fuel passage 100, and is guided to the nozzle hole 13. When the fuel injection valve 1 operates, the surrounding of the moving core 40 and the needle 30 is filled with the fuel. When the fuel injection valve 1 operates, the fuel flows through the through-hole 43 of the moving core 40, the axial hole portion 35 of the needle 30, and the radial hole portion 36. Therefore, the moving core 40 and the needle 30 can smoothly reciprocate in the axial direction inside the housing 20.

The present embodiment assumes a fuel pressure of approximately 20 MPa inside the fuel passage 100, for example, when the fuel injection valve 1 operates.

The description below explains in detail the nozzle hole 13 according to the present embodiment. The needle 30 is omitted from FIG. 5.

As illustrated in FIG. 5, the nozzle 10 includes a suction wall surface 150, an inlet opening portion 131, an outlet opening portion 132, a nozzle hole inner wall 133, the nozzle hole 13, and the valve seat 14.

The suction wall surface 150 is concaved from the center of a plane 121 on the side of the nozzle cylinder portion 11 of the nozzle bottom portion 12 to the side opposite from the nozzle cylinder portion 11, forming a suction chamber 15 inside. The suction chamber 15 is formed between the suction wall surface 150 and the seat portion 31 of the needle 30.

The valve seat 14 is formed annularly around the suction wall surface 150 of the plane 121. The valve seat 14 is tapered from the nozzle cylinder portion 11 toward the suction wall surface 150 to approach axis Ax1 of the nozzle cylinder portion 11.

The nozzle hole 13 connects the suction wall surface 150 with the surface 122 opposite from the nozzle cylinder portion 11 of the nozzle bottom portion 12 and injects the fuel contained in the fuel passage 100. The suction wall surface 150 and the surface 122 are curved.

As illustrated in FIG. 5, the nozzle hole 13 includes an inlet opening portion 131, an outlet opening portion 132, and a nozzle hole inner wall 133. The inlet opening portion 131 is formed on the suction wall surface 150 of the nozzle bottom portion 12 on the side of the nozzle cylinder portion 11. The outlet opening portion 132 is formed on the surface 122 of the nozzle bottom portion 12 opposite from the nozzle cylinder portion 11. The nozzle hole inner wall 133 connects inlet opening portion 131 with the outlet opening portion 132.

The inlet opening portion 131 signifies a closed region as a virtual surface formed along the suction wall surface 150 by making the hole (nozzle hole 13) in the nozzle bottom portion 12. The area of this region is assumed to be an area of the inlet opening portion 131. The outlet opening portion 132 signifies a closed region as a virtual surface formed along the surface 122 of the nozzle bottom portion 12 opposite from the nozzle cylinder portion 11 by making the hole (nozzle hole 13) in the nozzle bottom portion 12. The area of this region is assumed to be an area of the outlet opening portion 132. In each of the six nozzle holes 13, the area of the outlet opening portion 132 is larger than the area of the inlet opening portion 131.

According to the present embodiment, the six nozzle holes 13 are tapered such that the nozzle hole inner wall 133 departs from nozzle hole axis Axh1, as the axis of the nozzle hole 13, in the direction from the inlet opening portion 131 to the outlet opening portion 132.

As illustrated in FIG. 5, the cross-section including nozzle hole axis Axh1 shows the angle formed by the two nozzle hole inner walls 133 of one nozzle hole 13. This angle is referred to as a "nozzle hole open angle." The cross-section including nozzle hole axis Axh1 also shows the angle formed by two contours of fuel spray Fo injected from one nozzle hole 13. This angle is referred to as a "fuel spray open angle."

As illustrated in FIG. 4, the present embodiment forms the six inlet opening portions 131 of the nozzle hole 13 to be placed in the circumferential direction of the nozzle bottom portion 12. The six nozzle holes 13 are denoted as nozzle holes 61, 62, 63, 64, 65, and 66 for the sake of explanation. According to the present embodiment, the centers of the inlet opening portions 131 of the nozzle holes 61, 62, 63, 64, 65, and 66 are evenly spaced on pitch circle Cp1 around axis Ax1. In FIGS. 2 and 3, fuel sprays Fo injected from the nozzle holes 61, 62, 63, 64, 65, and 66 are denoted as F61 through F66, respectively.

The nozzle holes 61 and 64 are formed on virtual plane VP101 containing axis Ax1 of the nozzle cylinder portion 11 such that axis Ax1 of the nozzle cylinder portion 11 is located therebetween. Namely, virtual plane VP101 passes through the nozzle holes 61 and 64. The nozzle holes 61 and 64 are formed such that the corresponding nozzle hole axes Axh1 are included in virtual plane VP101.

The inlet opening portions 131 of the nozzle holes 62 and 66 are formed toward the nozzle hole 61 based on virtual plane VP102 that includes axis Ax1 of the nozzle cylinder portion 11 and is orthogonal to virtual plane VP101. The inlet opening portions 131 of the nozzle holes 63 and 65 are formed toward the nozzle hole 64 based on virtual plane VP102.

The nozzle holes 63 and 65 allow the ratio of longest diameter a1 to shortest diameter 131 of the outlet opening portion 132 to be greater than 1. When viewed in the direction of nozzle hole axis Axh1, the outlet opening portions 132 of the nozzle holes 63 and 65 are shaped to be elliptic, namely, non-circular (see FIG. 4). The nozzle holes 63 and 65 are denoted as "non-circular nozzle holes." Where appropriate, the nozzle holes 63 and 65 are also denoted as "oval nozzle holes" or "elliptical nozzle holes." The "oval nozzle hole" is characterized in that the shape of the outlet opening portion 132 is not a perfect circle and is shaped into an oval such as egg, ellipse, or track, for example. The ellipse is a plane curve such that the sums of the distances of each point in its periphery from the two foci are constant. According to the present embodiment, the shape of the outlet opening portions 132 of the nozzle holes 63 and 65 is an ellipse containing two foci. In the description below, the "oval nozzle hole" is assumed to include the nozzle hole 13 whose outlet opening portion 132 is shaped into an egg, ellipse, or track. The "non-circular nozzle hole" is assumed to include an "oval nozzle hole," an "elliptical nozzle hole," or a "track nozzle hole." The "longest diameter" signifies the longest width of the shape and is comparable to the length of a major axis concerning the shape of the outlet opening portion 132 of the nozzle holes 63 and 65. The "shortest diameter" signifies the shortest width of the shape and is comparable to the length of a minor axis concerning the shape of the outlet opening portion 132 of the nozzle holes 63 and 65.

The nozzle holes 61, 62, 64, and 66 allow the ratio of longest diameter a2 to shortest diameter b2 of the outlet opening portion 132 to be 1. When viewed in the direction of nozzle hole axis Axh1, the outlet opening portions 132 of the nozzle holes 61, 62, 64, and 66 are shaped to be perfectly circular (see FIG. 4). The nozzle holes 61, 62, 64, and 66 are denoted as "circular nozzle holes."

According to the present embodiment as above, one or more (two) of the nozzle holes 13 are non-circular nozzle holes that allow the ratio of the longest diameter to the shortest diameter of the outlet opening portion 132 to be greater than 1.

Figure 6:
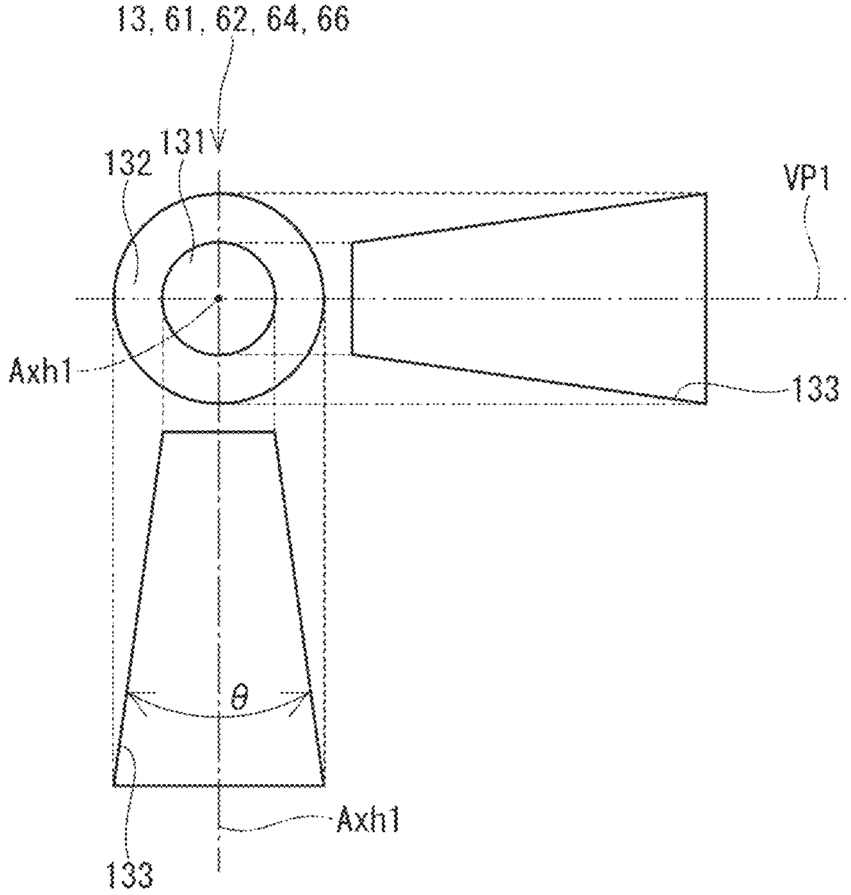
FIG. 6 is a schematic diagram illustrating the circular nozzle hole of the fuel injection valve according to the first embodiment.

As illustrated in FIG. 6, the nozzle holes 61, 62, 64, and 66 as circular nozzle holes include the inlet opening portion 131 and the outlet opening portion 132 shaped into perfect circles. The inlet opening portion 131 and the outlet opening portion 132 are formed coaxially. Angle θ between the nozzle hole inner walls 133 is constant in the circumferential direction of the outlet opening portion 132 according to the cross-section along first virtual plane VP1 as a virtual plane containing nozzle hole axis Axh1.

Figure 7:
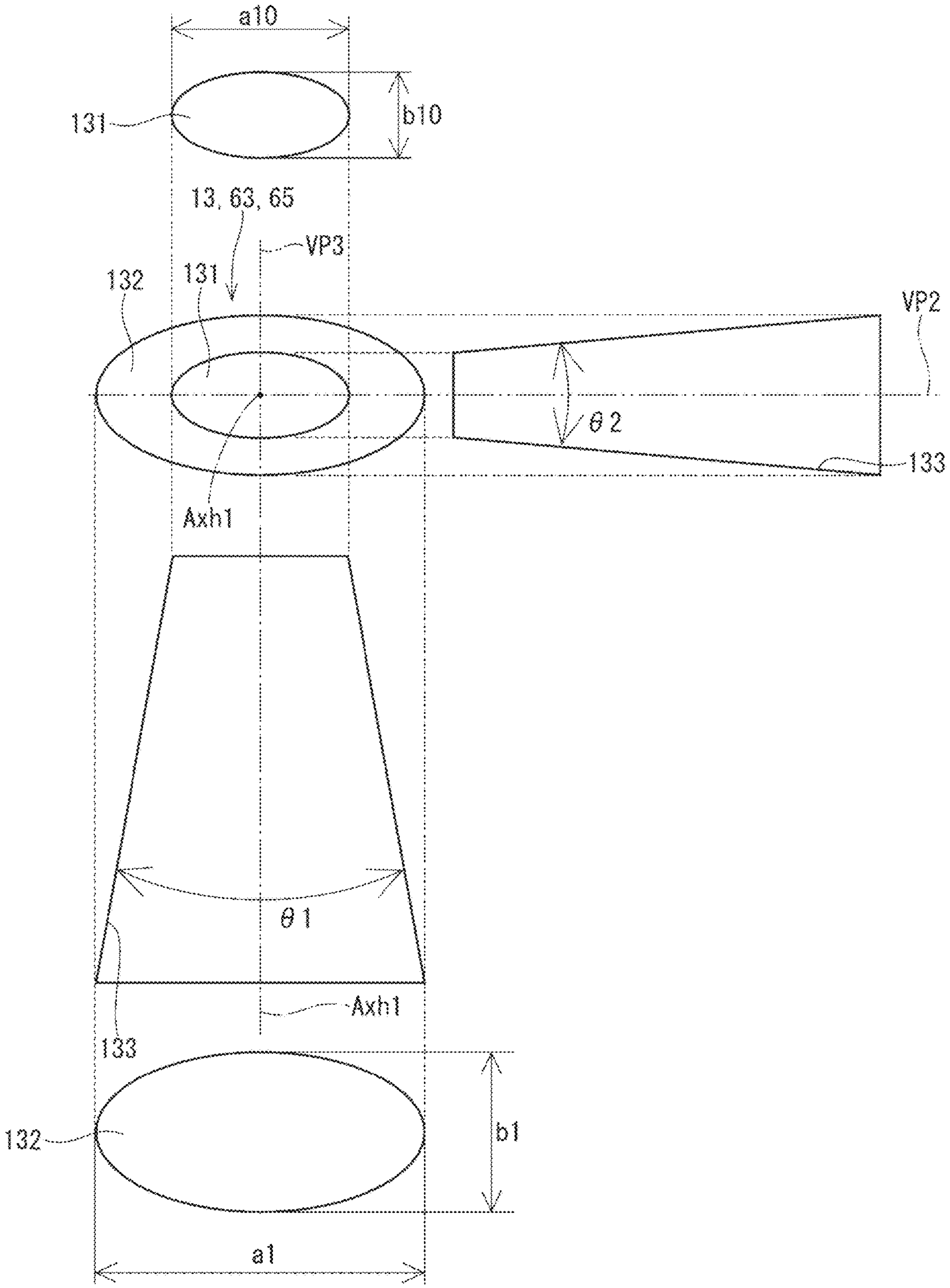
FIG. 7 is a schematic diagram illustrating a non-circular nozzle hole of the fuel injection valve according to the first embodiment.

As illustrated in FIG. 7, the nozzle holes 63 and 65 as non-circular nozzle holes include the inlet opening portion 131 and the outlet opening portion 132 shaped into ellipses. The inlet opening portion 131 and the outlet opening portion 132 are formed coaxially to ensure the same directions in the major axes and the minor axes. Suppose 81 denotes the largest angle between the nozzle hole inner walls 133 according to the cross-section along second virtual plane VP2 as a virtual plane containing nozzle hole axis Axh1. Suppose 82 denotes the smallest angle between the nozzle hole inner walls 133 according to the cross-section along third virtual plane VP3 as a virtual plane containing nozzle hole axis Axh1. Then, second virtual plane VP2 and third virtual plane VP3 are orthogonal to each other.

The outlet opening portion 132 has a long diameter, its length defined as a1, and a short diameter, its length defined as b1. The inlet opening portion 131 has a long diameter, its length defined as a10, and a short diameter, its length defined as b10. Then, the nozzle holes 63 and 65 as non-circular nozzle holes indicate an ellipticity of a1/b1=a10/b10. Namely, the non-circular nozzle holes are ellipses that use the same ellipticity for the inlet opening portion 131 and the outlet opening portion 132. The "long diameter" signifies the longest width of the shape and corresponds to the "major axis" in ellipses. The "short diameter" signifies the shortest width of the shape and corresponds to the "minor axis" in ellipses.

Figure 8:
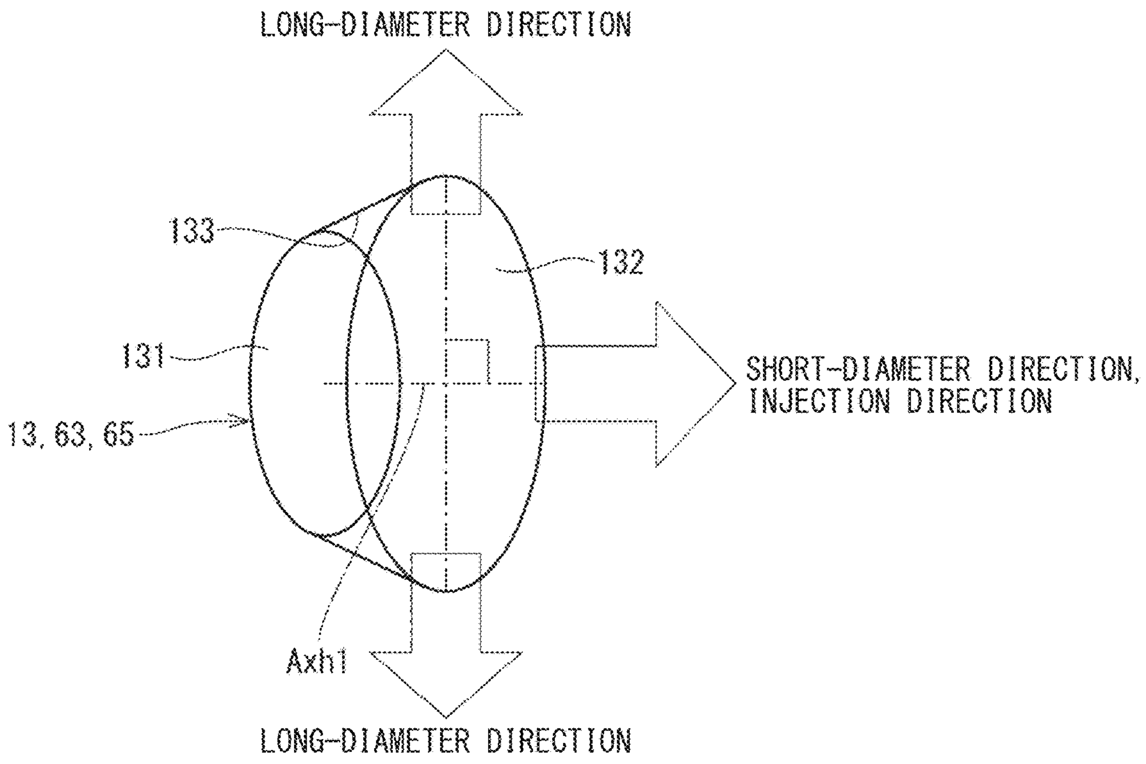
FIG. 8 is a schematic diagram illustrating a non-circular nozzle hole of the fuel injection valve according to the first embodiment.
Figure 9:
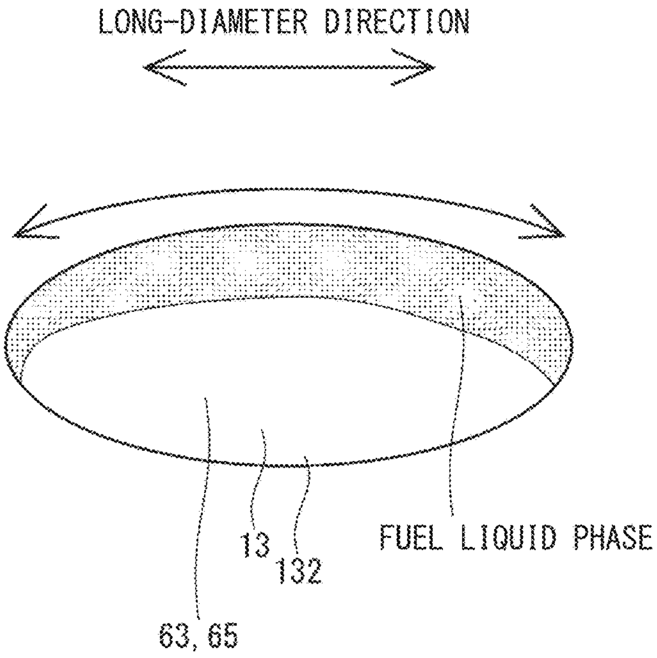
FIG. 9 is a diagram illustrating the non-circular nozzle hole during fuel injection from the fuel injection valve according to the first embodiment.

As illustrated in FIG. 8, the nozzle holes 63 and 65 as non-circular nozzle holes are formed such that the short-diameter direction of the outlet opening portion 132 follows the injection direction of the fuel injected from the non-circular nozzle hole. When the short-diameter direction and the injection direction coincide, the minor axis exists on the virtual plane that passes through nozzle hole axis Axh1 and is parallel to axis Ax1. The expression of using the word "follow" applies even if processing variations are included. The "short-diameter direction" corresponds to the direction following the short diameter, namely, the minor axis of the outlet opening portion 132 from the viewpoint along axis Ax1 of the nozzle cylinder portion 11. The "fuel injection direction" corresponds to the direction following nozzle hole axis Axh1 from the viewpoint along axis Ax1 of the nozzle cylinder portion 11. In FIGS. 8 and 9, the "long-diameter direction" corresponds to the direction following the long diameter, namely, the major axis of the outlet opening portion 132.

As illustrated in FIG. 5, the multiple nozzle holes 13 include the circular nozzle hole where the ratio of the longest diameter to the shortest diameter of the outlet opening portion 132 is 1. Suppose θ (deg) denotes the nozzle hole open angle of the circular nozzle hole (64). Suppose θf (deg) denotes the open angle of fuel spray Fo injected from the circular nozzle hole. Suppose P (MPa) denotes the average pressure of the fuel in the fuel passage 100 when the fuel is injected from the circular nozzle hole.

A virtual cone, namely, virtual circular cone Vc1 (see FIG. 5) is defined as follows. Suppose vertex Pv1 denotes an intersection point between nozzle hole axis Axh1 of the circular nozzle hole and the outlet opening portion 132. Suppose θf $$\theta f=\theta+0.5\times P^{\wedge}0.6 \qquad \text{equation 1}$$

denotes the angle formed between two generatrices in the cross-section along first virtual plane VP1 including nozzle hole axis Axh1 of the circular nozzle hole. Symbol "^" represents a power. In equation 1, "0.5×P^0.6" denotes a difference between the "nozzle hole open angle" (θ) and the "fuel spray open angle" (θf=δ+0.5×P^0.6). The difference corresponds to the "fuel spray open angle increasing due to fuel pressures in the fuel passage 100." When P is 20 (MPa), 0.5×P^0.6 approximates to 3.0.

Figure 10:
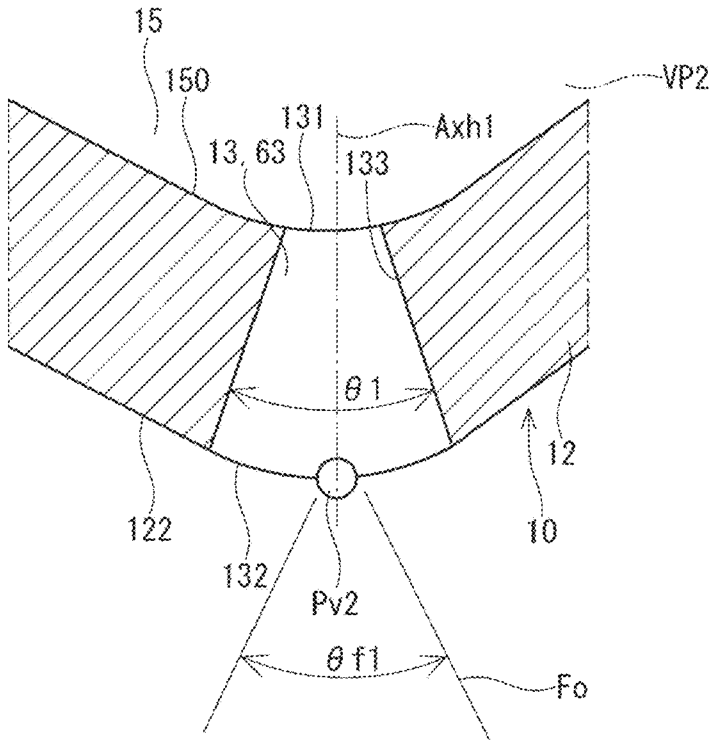
FIG. 10 is a sectional view including the non-circular nozzle hole of the fuel injection valve according to the first embodiment.
Figure 11:
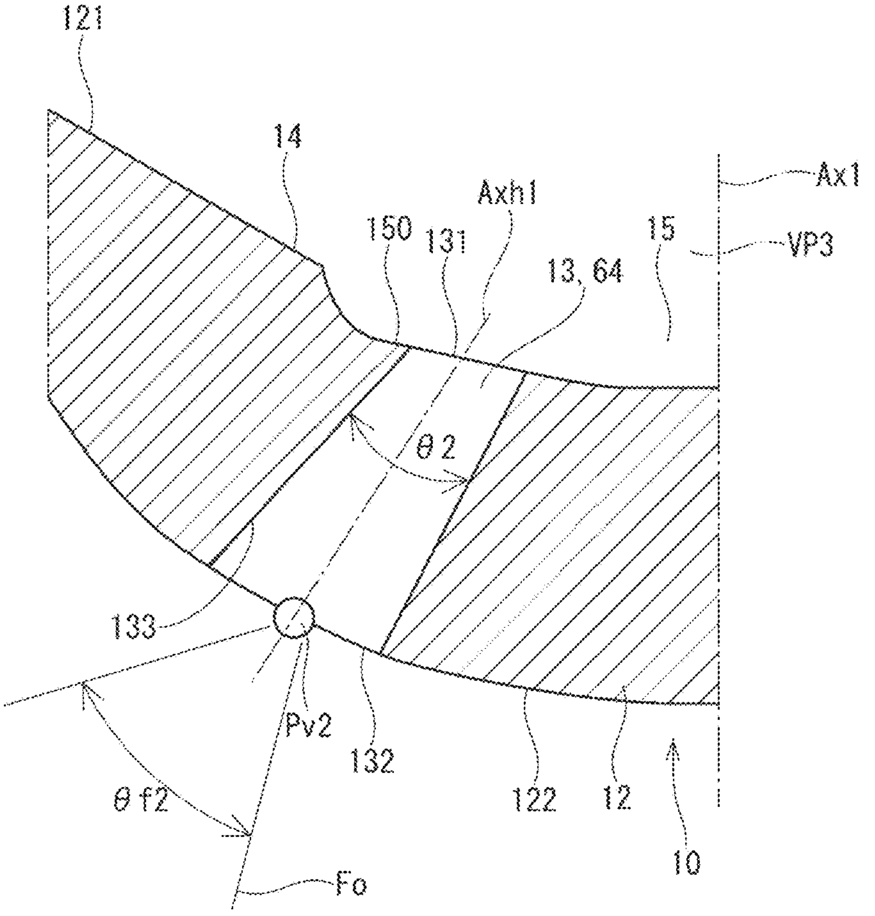
FIG. 11 is a sectional view including the non-circular nozzle hole of the fuel injection valve according to the first embodiment.

As illustrated in FIGS. 10 and 11, suppose θ1 (deg) denotes the maximum nozzle hole open angle of the non-circular nozzle hole (63). Suppose θ2 (deg) denotes the smallest nozzle hole open angle of the same. Suppose θf1 (deg) denotes the maximum open angle of fuel spray Fo injected from the non-circular nozzle hole. Suppose θf2 (deg) denotes the minimum open angle of fuel spray Fo injected from the non-circular nozzle hole.

Suppose vertex Pv2 denotes an intersection point between nozzle hole axis Axh1 of the non-circular nozzle hole and the outlet opening portion 132. Suppose θf1

$$\theta f1=\theta 1+0.5\times P^{\wedge}0.6+17\times e^{\wedge}(-0.13\times\theta 1) \qquad \text{equation 2}$$

denotes the largest angle between two generatrices in the cross-section along second virtual plane VP2 including nozzle hole axis Axh1 of the non-circular nozzle hole (see FIG. 10). In equation 2, "17×e^(−0.13×θ1)" denotes a difference between the sum of the "nozzle hole open angle" (θ1) and the "fuel spray open angle increasing due to fuel pressures in the fuel passage 100" (0.5×P^0.6) and the "fuel spray open angle" (θf1=θ1+0.5×P^0.6+17×e^(−0.13×θ1)). The difference corresponds to the "fuel spray open angle increasing due to shapes of the non-circular nozzle hole."

Figure 12:
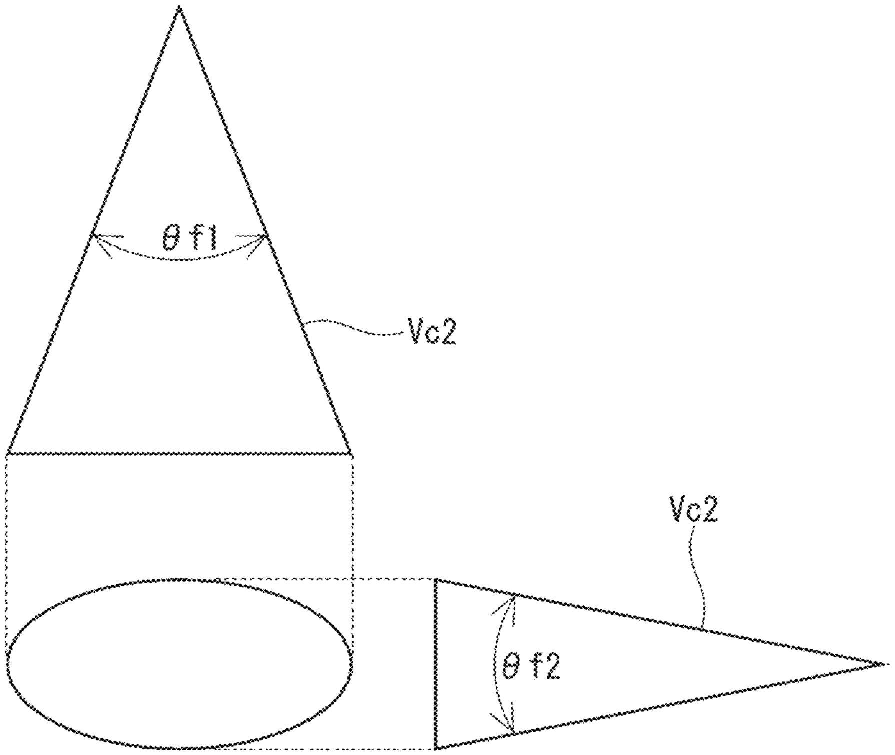
FIG. 12 is a diagram illustrating a virtual non-circular cone of the fuel injection valve according to the first embodiment.

Virtual non-circular cone Vc2 is defined as a virtual cone containing θf2

$$\theta f2=\theta 2+0.5\times P^{\wedge}0.6 \qquad \text{equation 3}$$

as the smallest angle between two generatrices in the cross-section along third virtual plane VP3 that includes nozzle hole axis Axh1 of the non-circular nozzle hole and intersects with second virtual plane VP2 (see FIGS. 10, 11, and 12). Then, at least two adjacent ones of the six nozzle holes 13 are formed such that virtual circular cone Vc1 or virtual non-circular cone Vc2 does not interfere with virtual circular cone Vc1 or virtual non-circular cone Vc2. In equation 3, "0.5×P^0.6" is a difference between the "nozzle hole open angle" (θ2) and the "fuel spray open angle" (θf2=θ2+0.5×P^0.6). The difference corresponds to the "fuel spray open angle increasing due to fuel pressures in the fuel passage 100."

According to the present embodiment, all the six nozzle holes 13 are formed such that virtual circular cone Vc1 or virtual non-circular cone Vc2 does not interfere with virtual circular cone Vc1 or virtual non-circular cone Vc2.

Figure 13:
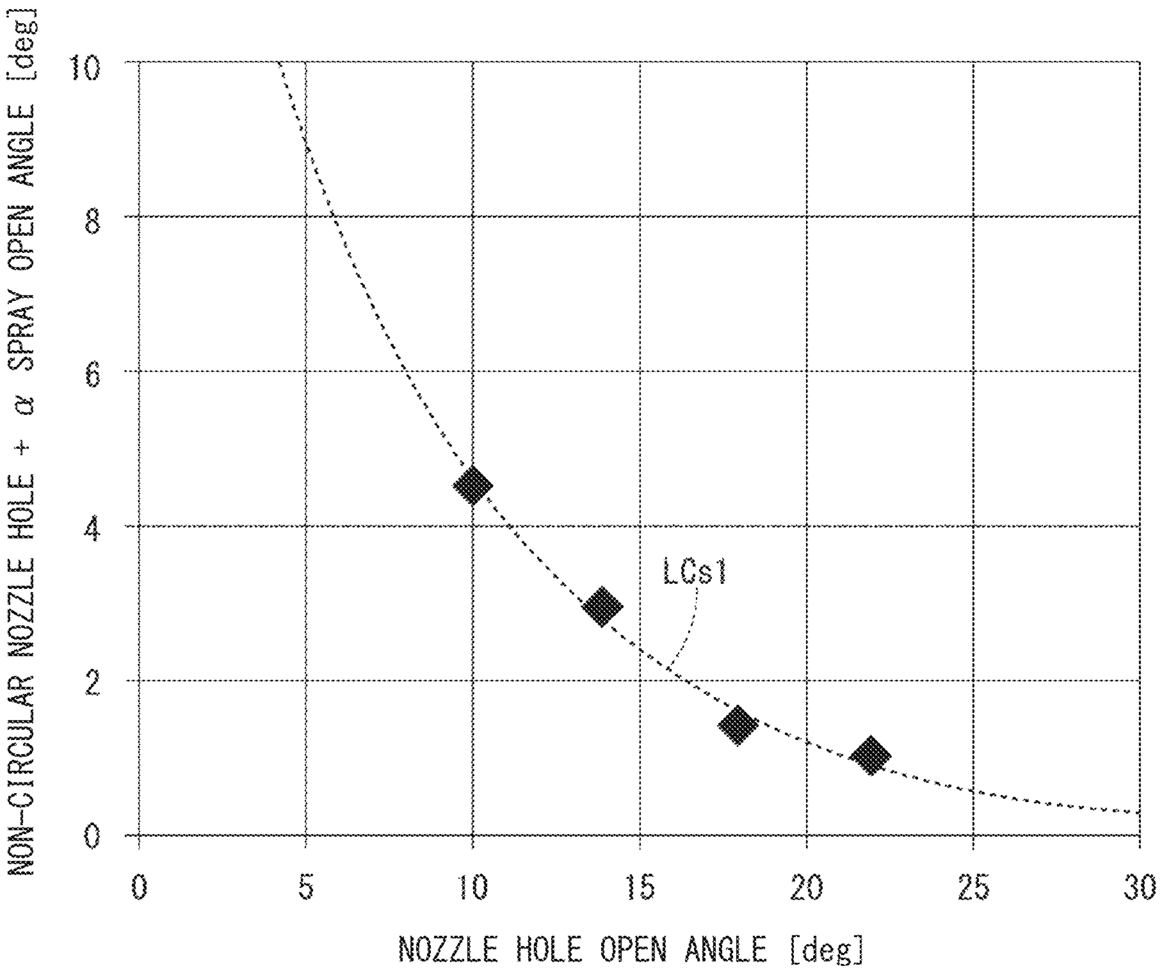
FIG. 13 is a diagram illustrating the relationship between a "nozzle hole open angle" and a "fuel spray open angle increasing due to shapes of the non-circular nozzle hole" in the non-circular nozzle hole of the fuel injection valve according to the first embodiment.

FIG. 13 illustrates an analysis result showing the relationship between the "nozzle hole open angle" (θ1) and the "fuel spray open angle increasing due to shapes of the non-circular nozzle hole" (non-circular nozzle hole+a spray open angle) while the "nozzle hole open angle" (θ1) is changed. As illustrated in FIG. 13, an increase in the "nozzle hole open angle" (θ1) decreases the "fuel spray open angle increasing due to shapes of the non-circular nozzle hole." Approximate curve LCs1 shows the relationship between the "nozzle hole open angle" (θ1) and the "fuel spray open angle increasing due to shapes of the non-circular nozzle hole" (non-circular nozzle hole+a spray open angle). Approximate curve LCs1 corresponds to "17×e^(−0.13×θ1)" in equation 2 above.

The description below explains how to define nozzle hole axis Axh1 of the "ellipse nozzle hole."

Step 1

Figure 14:
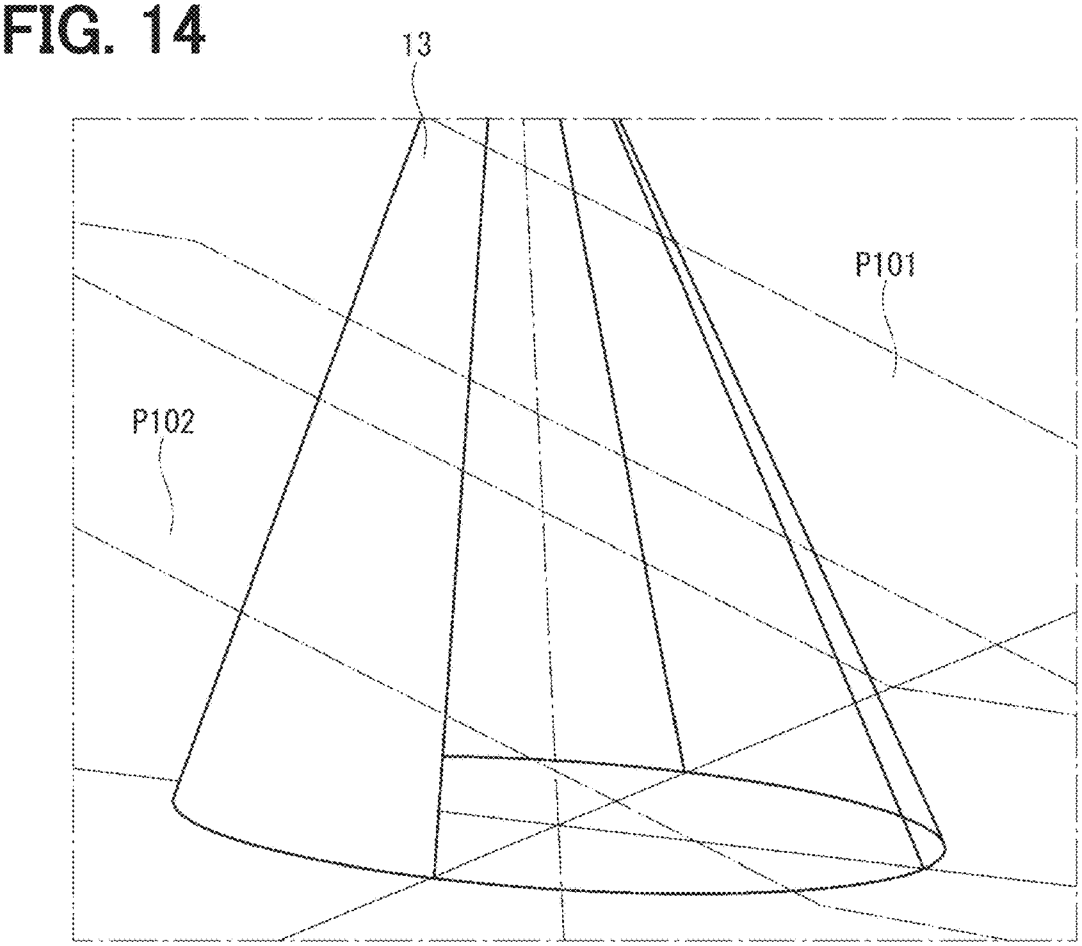
FIG. 14 is a diagram illustrating how to define a nozzle hole axis of the non-circular nozzle hole of the fuel injection valve according to the first embodiment.
Figure 15:
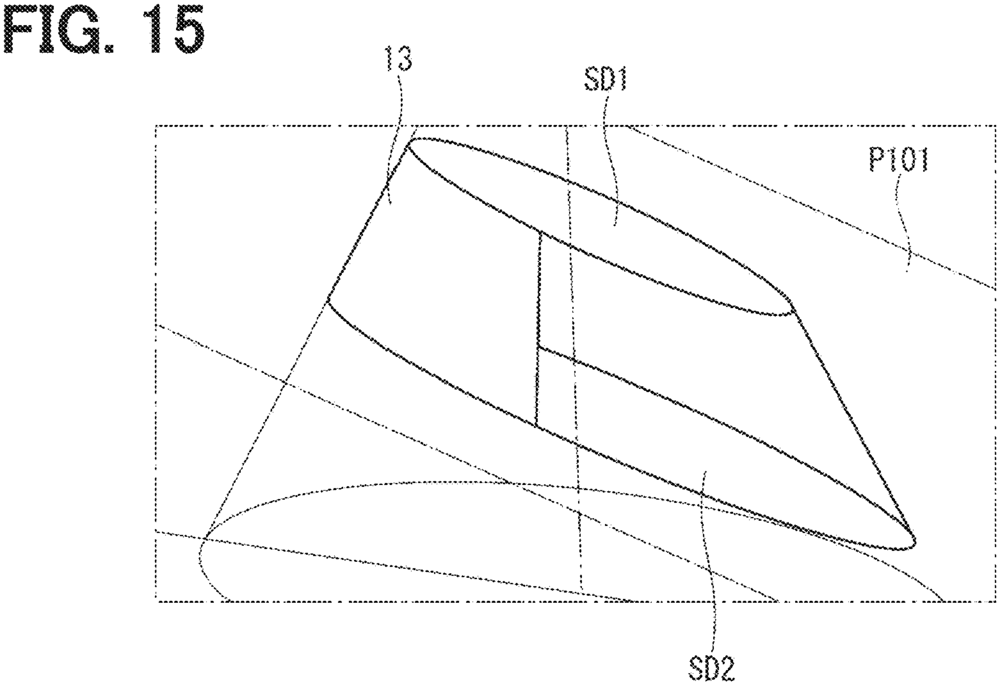
FIG. 15 is a diagram illustrating how to define a nozzle hole axis of the non-circular nozzle hole of the fuel injection valve according to the first embodiment.

As illustrated in FIGS. 14 and 15, cut the nozzle hole 13 on two appropriate parallel planes P101 and P102.

Step 2

Figure 16:
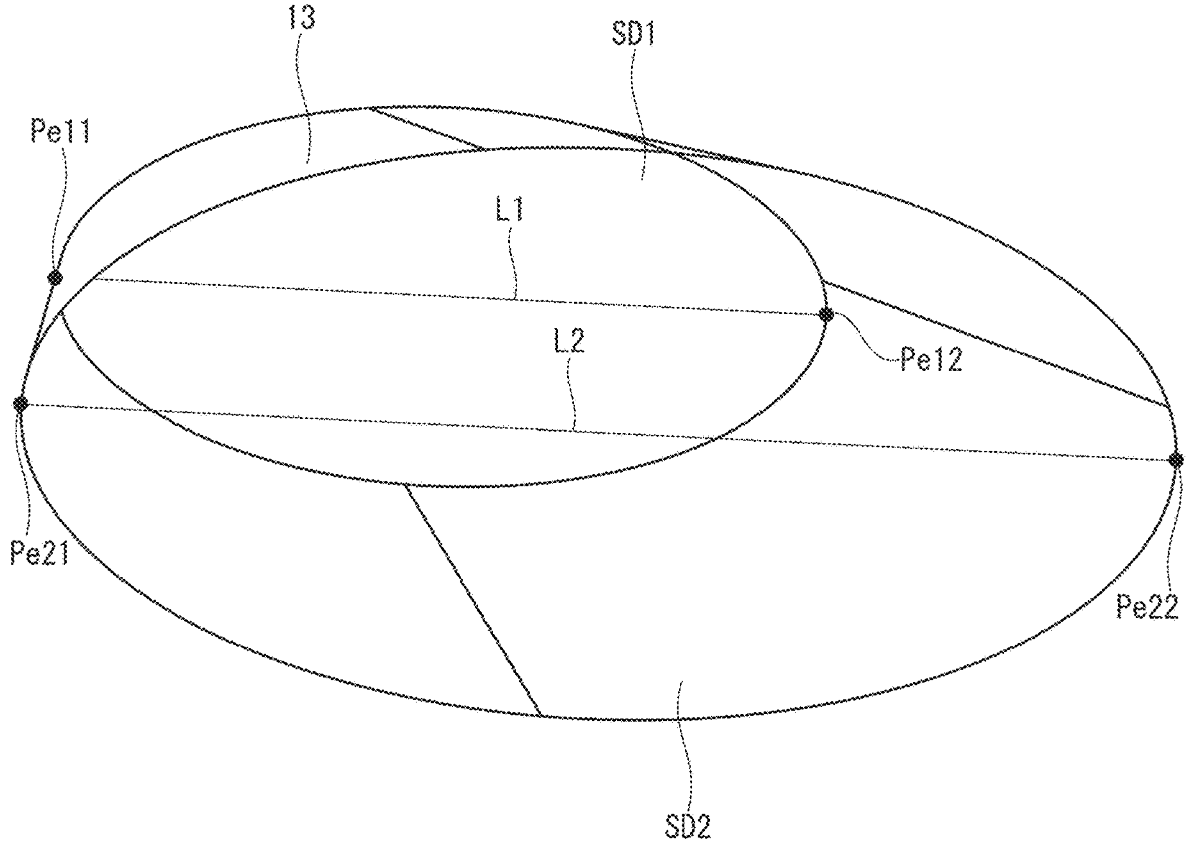
FIG. 16 is a diagram illustrating how to define a nozzle hole axis of the non-circular nozzle hole of the fuel injection valve according to the first embodiment.

As illustrated in FIG. 16, suppose lines L1 and L2 passing through the largest widths of cross-sections SD1 and SD2 contained in the nozzle hole 13 that is cut at step 1. Suppose intersection points Pe11, Pe12, Pe21, and Pe22 from lines L1 and L2 that intersect with the outer edges of cross-sections SD1 and SD2.

Step 3

Figure 17:
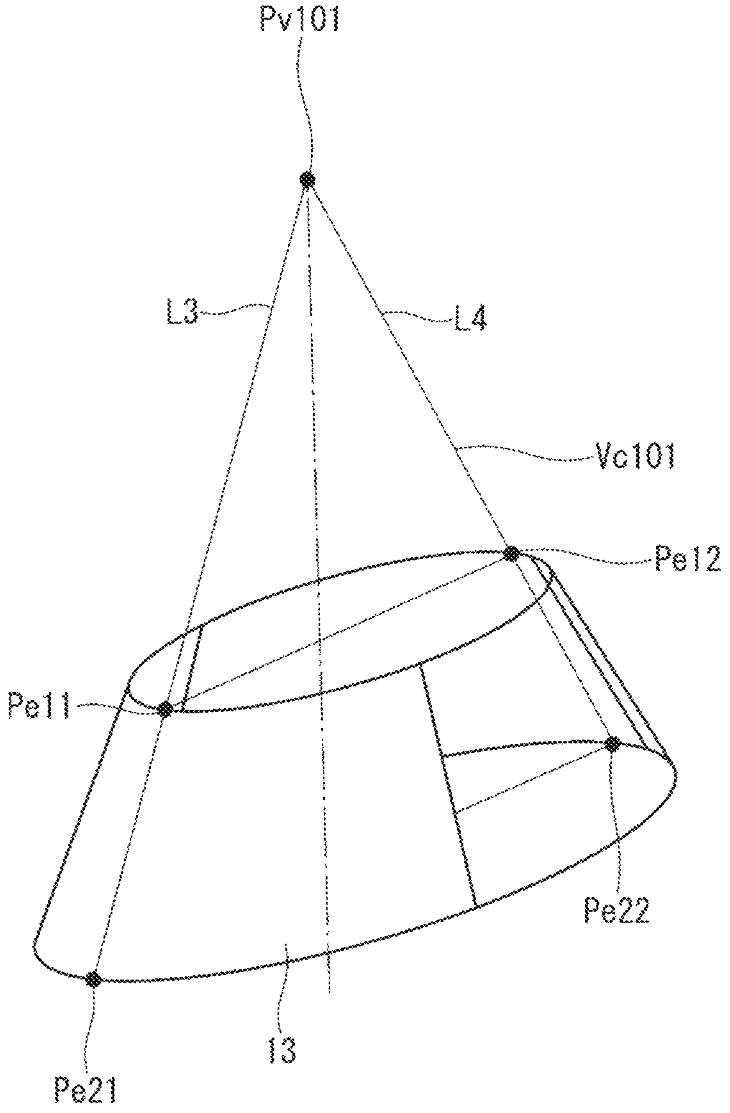
FIG. 17 is a diagram illustrating how to define a nozzle hole axis of the non-circular nozzle hole of the fuel injection valve according to the first embodiment.

As illustrated in FIG. 17, suppose line L3 by extending a line segment that connects intersection points Pe21 and Pe11 defined at step 2. Suppose line L4 by extending a line segment that connects intersection points Pe22 and Pe12.

Define Vertex Pv101 of virtual cone Vc101 as an intersection point between lines L3 and L4.

Step 4

Figure 18:
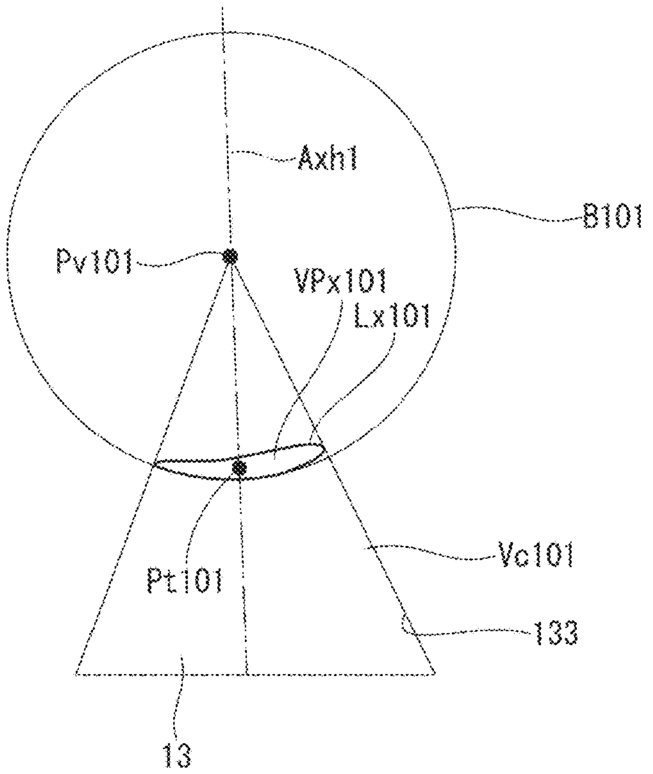
FIG. 18 is a diagram illustrating how to define a nozzle hole axis of the non-circular nozzle hole of the fuel injection valve according to the first embodiment.
Figure 19:
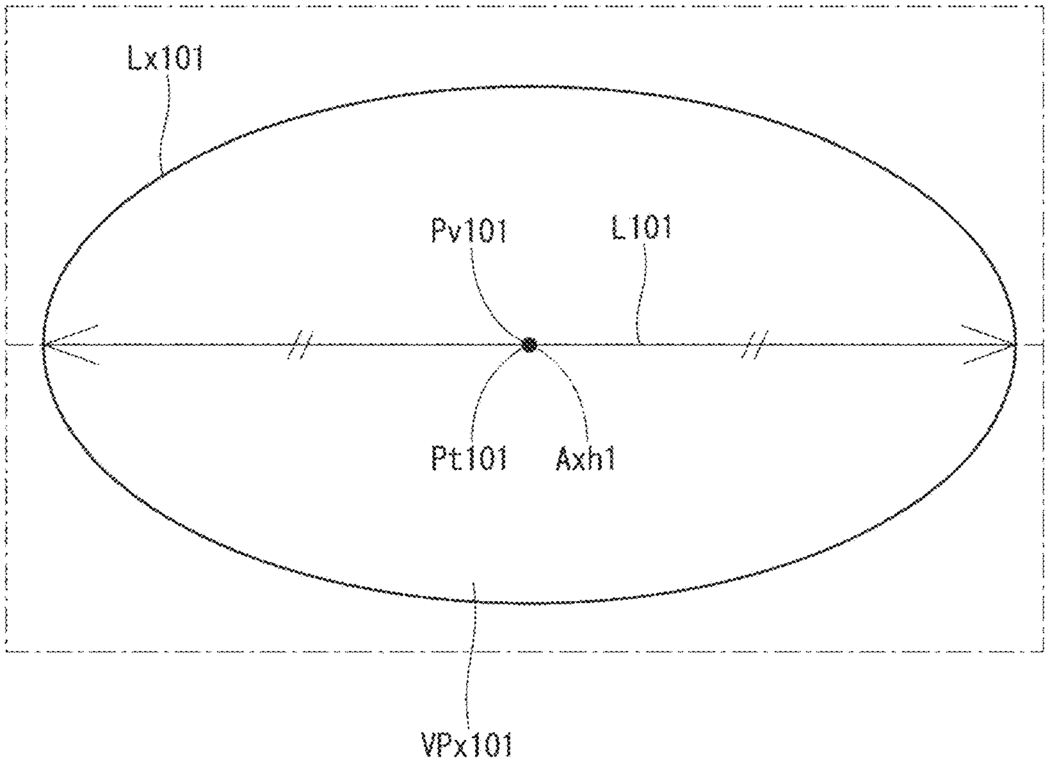
FIG. 19 is a diagram illustrating how to define a nozzle hole axis of the non-circular nozzle hole of the fuel injection valve according to the first embodiment.

As illustrated in FIG. 18, create sphere B101 around vertex Pv101 defined at step 3. Suppose virtual plane VPx101 as a plane formed inside line intersection Lx101 between sphere B101 and virtual cone Vc101 (nozzle hole inner wall 133). Inside virtual plane VPx101, find point Pt101 (see FIG. 19) that bisects line L101 passing through the largest width of virtual plane VPx101. Then, the line connecting point Pt101 and vertex Pv101 corresponds to nozzle hole axis Axh1.

Figure 20:
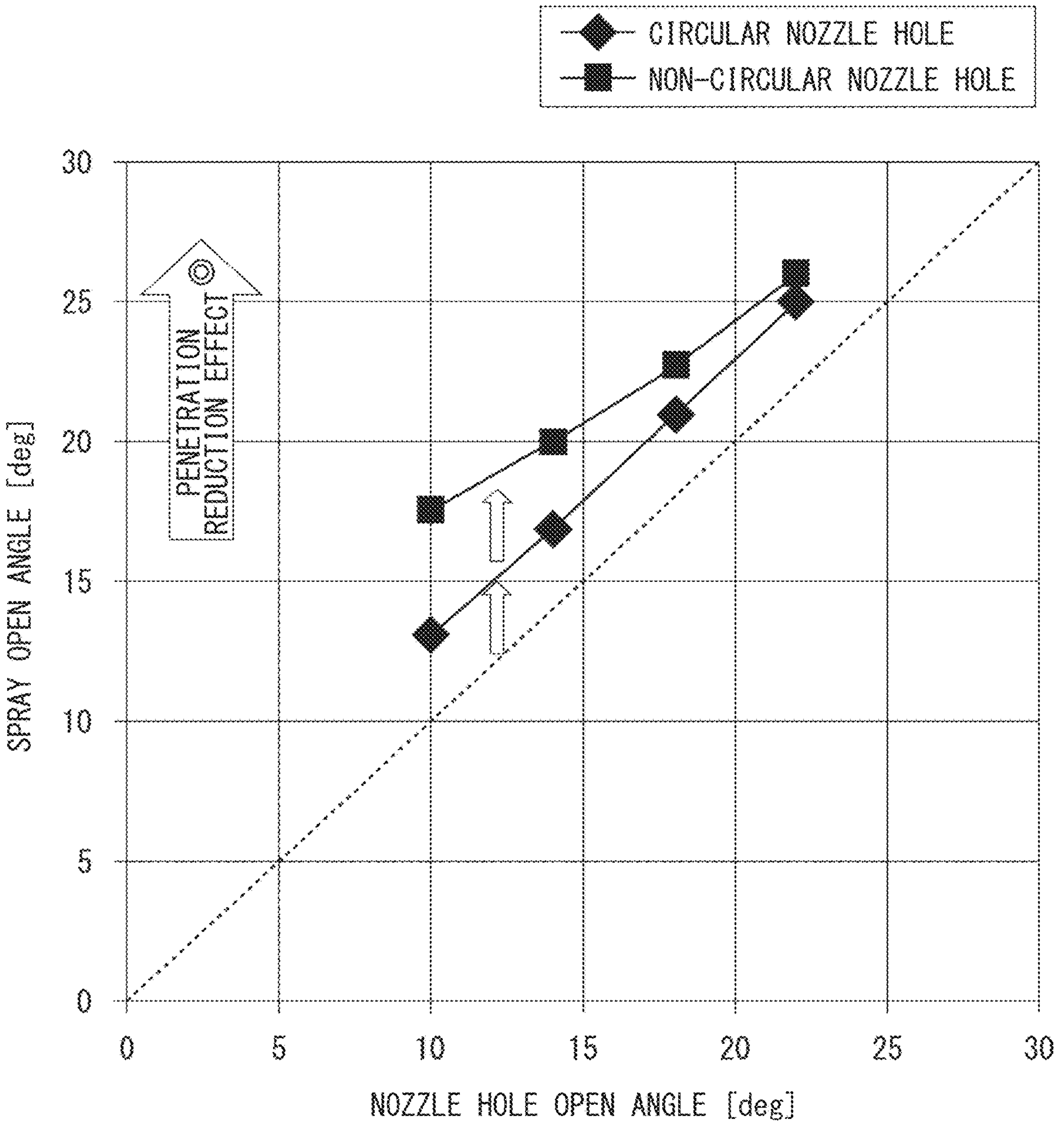
FIG. 20 is a diagram illustrating the relationship between a "nozzle hole open angle" and a "spray open angle" of the fuel injection valve according to the first embodiment.

As illustrated in FIG. 20, the spray open angle of the fuel injected from the circular nozzle hole is found by adding the "nozzle hole open angle" and "0.5×P^0.6" corresponding to the "fuel spray open angle increasing due to fuel pressures in the fuel passage 100." On the long diameter, the spray open angle of the fuel injected from the non-circular nozzle hole is found by adding "nozzle hole open angle," "0.5×P^0.6," and "17×e^(−0.13×θ1)" corresponding to the "fuel spray open angle increasing due to shapes of the non-circular nozzle hole."

As illustrated in FIG. 20, the fuel spray open angles from the non-circular nozzle hole are larger than those from the circular nozzle hole as a comparison on the long diameters.

Because of the increased angle of the fuel spray from the non-circular nozzle hole, the fuel spray injected from the non-circular nozzle hole is shorter than the fuel spray injected from the circular nozzle hole. Therefore, the non-circular nozzle hole can more effectively reduce the fuel spray penetration than the circular nozzle hole.

The present embodiment places the nozzle holes 61, 62, 64, and 66 as circular nozzle holes and the nozzle holes 63 and 65 as non-circular nozzle holes as illustrated in FIG. 4. All the nozzle holes 13 (nozzle holes 61 through 66) are formed such that virtual non-circular cone Vc2 does not interfere with virtual circular cone Vc1 or virtual non-circular cone Vc2. No closed space is formed between fuel sprays. The air can be taken without generating negative pressure. It is possible to inhibit fuel sprays from being shrunk and coalesced with each other. It is possible to inhibit an increased spray penetration from wetting inside the cylinder and deteriorating the spraying characteristics. At least one non-circular nozzle hole is included to inhibit deposit from accumulating on the nozzle hole inner wall 133 and reduce the fuel spray penetration. The nozzle hole 13 is formed and the nozzle hole open angle is appropriately adjusted such that the fuel sprays injected from the nozzle hole 13 do not interfere with each other. It is possible to inhibit an increased spray penetration from wetting inside the cylinder and deteriorating the spraying characteristics.

As illustrated in FIGS. 2 through 4, the present embodiment reduces penetrations of fuel sprays F63 and F65 injected from the nozzle holes 63 and 65, namely, the "elliptical nozzle holes" close to the inner wall of the cylinder according to the sideways installation. Therefore, it is possible to effectively inhibit the inner wall of the cylinder from being wet.

Figure 21:
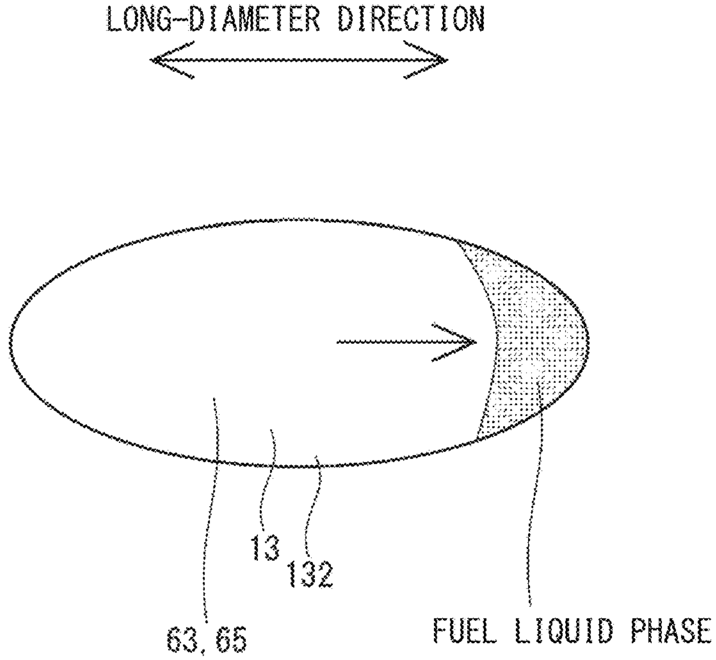
FIG. 21 is a diagram illustrating the non-circular nozzle hole at the end of fuel injection from the fuel injection valve according to the first embodiment.
Figure 22:
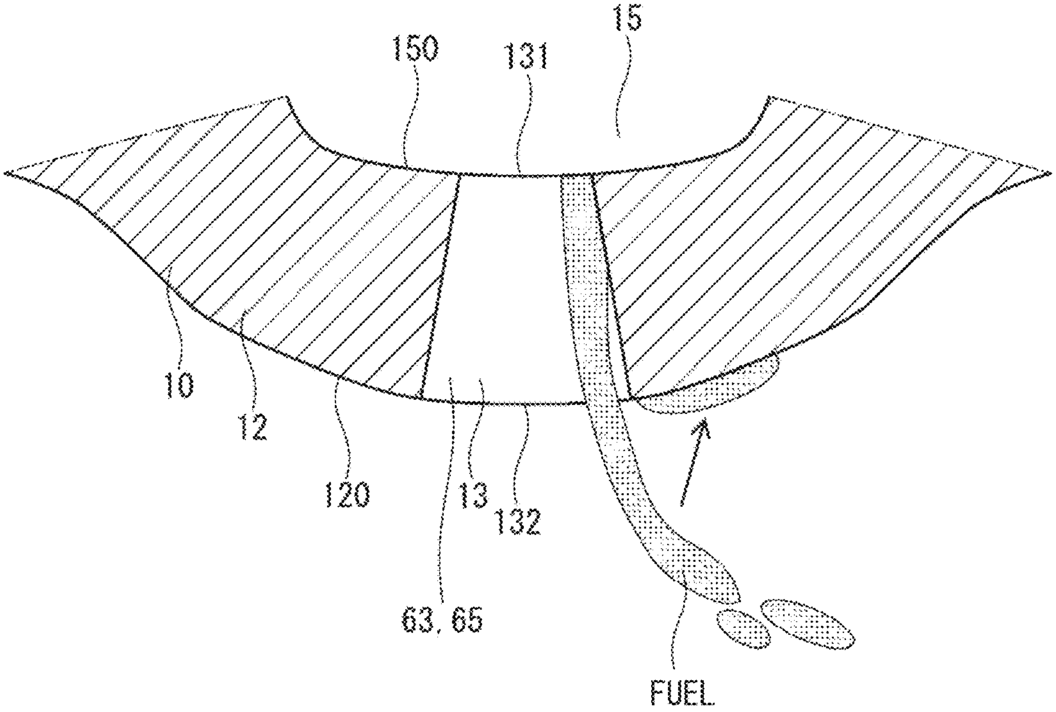
FIG. 22 is a sectional view illustrating the non-circular nozzle hole at the end of fuel injection from the fuel injection valve according to the first embodiment.

As illustrated in FIG. 9, during fuel injection, the non-circular nozzle hole spreads the fuel in the long-diameter direction (major axis) and injects the fuel in the form of a liquid film to promote dispersion, making it possible to atomize the fuel spray. However, at the end of injection after the needle 30 is seated, the oval nozzle hole causes the fuel in the nozzle hole to collect at the corner in the long-diameter direction (major axis) and to be injected in the form of a liquid thread, making it hard for the fuel to drip smoothly. The wetness may increase on the outer wall of the nozzle 10 around the nozzle hole (see FIGS. 21 and 22).

As illustrated in FIG. 4, the outlet opening portion 132 of the nozzle hole 63 as a non-circular nozzle hole indicates the ellipticity of a1/b1 (>1) that is greater than the ellipticity of a2/b2 (=1) indicated by the outlet opening portion 132 of the nozzle hole 64 as a circular nozzle hole. The area of the inlet opening portion 131 of the non-circular nozzle hole (63, 65) having the outlet opening portion 132 with a large ellipticity is smaller than the area of the inlet opening portion 131 of the circular nozzle hole (61, 62, 64, 66) having the outlet opening portion 132 with a small ellipticity.

The present embodiment completes the fuel injection from the nozzle hole 13 after the needle 30 is seated, as follows. The air enters the suction chamber 15 from the non-circular nozzle hole (63,65) where the inlet opening portion 131 has a small area to inhibit the fuel from flowing smoothly and the inlet opening portion 132 has a large ellipticity. The injection ends by clearing the fuel from the circular nozzle hole (61,62,64,66) where the inlet opening portion 131 has a large area to smoothly flow the fuel and the inlet opening portion 132 has a small ellipticity. It is possible to inhibit fuel wetting by decreasing the amount of low-pressure fuel injected from the nozzle hole 13 that has a large ellipticity and easily causes fuel wetting. It is possible to suppress the tip wet almost as effectively as the conventional technology while increasing the fuel spray angle and minimizing the effect of spray changes.

As above, the present embodiment uses one or more of the nozzle holes 13 as non-circular nozzle holes where the ratio of the longest diameter to the shortest diameter of the outlet opening portion 132 is greater than 1. Thereby, it is possible to inhibit deposit from accumulating on the nozzle hole inner wall 133.

Virtual non-circular cone Vc2 and virtual circular cone Vc1 are defined for the non-circular nozzle hole and the circular nozzle hole each. At least two adjacent nozzle holes 13 are formed such that virtual non-circular cone Vc2 does not interfere with virtual circular cone Vc1 or virtual non-circular cone Vc2. It is possible to inhibit interference between fuel sprays injected from nozzle holes 13. No closed space is formed between fuel sprays. The air can be taken with no negative pressure generated. It is possible to inhibit fuel sprays from being shrunk and coalesced with each other. It is possible to inhibit an increased spray penetration from wetting inside the cylinder and deteriorating the spraying characteristics.

According to the present embodiment, the nozzle holes 63 and 65 as non-circular nozzle holes are formed such that the short-diameter direction of the outlet opening portion 132 follows the injection direction of the fuel injected from the non-circular nozzle hole. Therefore, the liquid film can be thinned and atomized by allowing the fuel to follow the nozzle hole inner wall 133 in the major axis direction.

According to the present embodiment, one or more non-circular nozzle holes (63, 65) are elliptical to include the inlet opening portion 131 and the outlet opening portion 132 with the same ellipticity. When the nozzle hole 13 is laser-processed, the laser can be scanned by fixing focal points. Non-circular nozzle holes can be easily formed.

Second Embodiment

Figure 23:
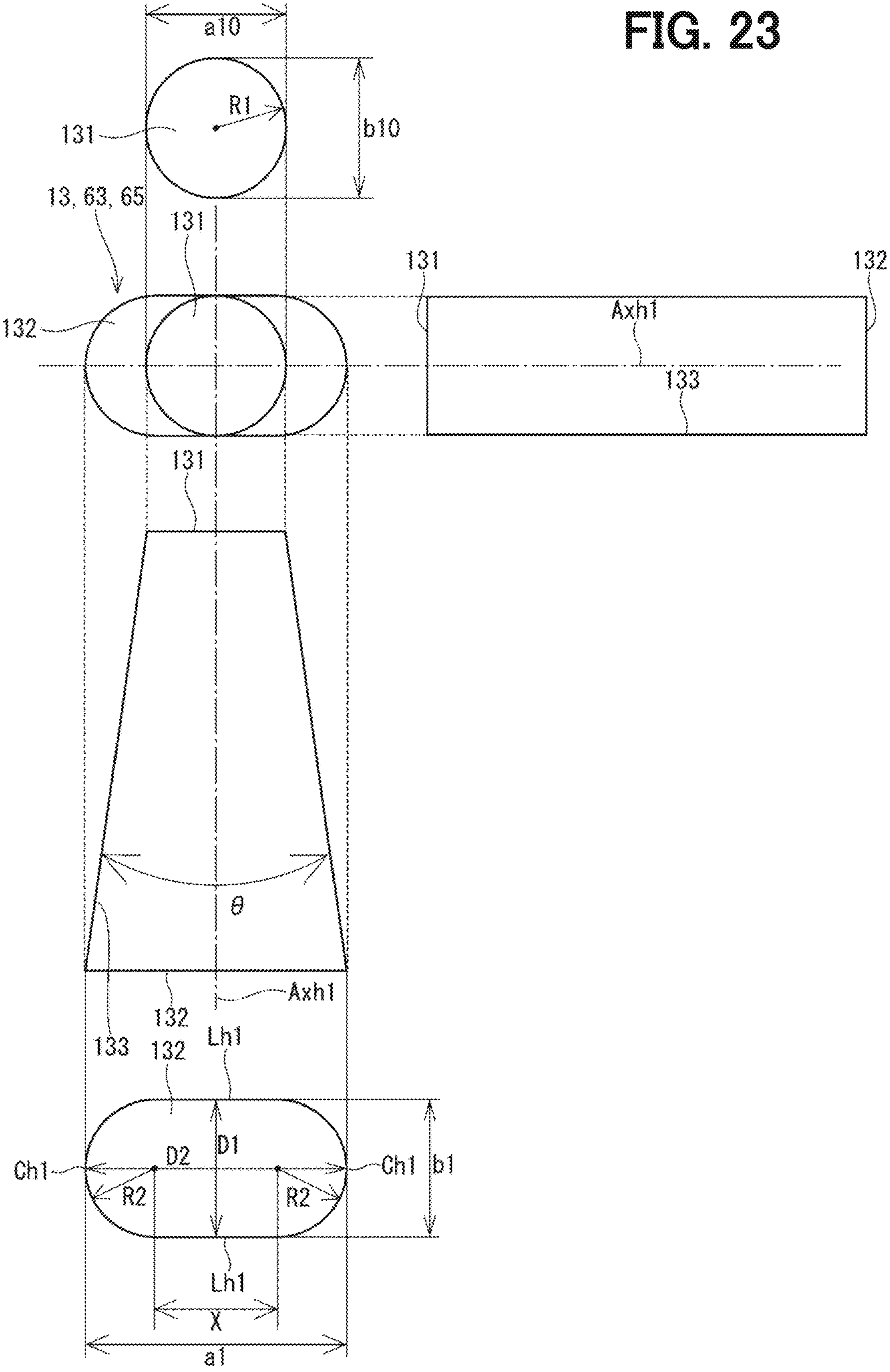
FIG. 23 is a schematic diagram illustrating a non-circular nozzle hole of the fuel injection valve according to a second embodiment.

FIG. 23 illustrates a part of the fuel injection valve according to the second embodiment. The second embodiment differs from the first embodiment in the configuration of non-circular nozzle holes.

According to the present embodiment, as illustrated in FIG. 23, the nozzle holes 63 and 65 as non-circular nozzle holes include the inlet opening portion 131 shaped into a perfect circle with radius R1. The outlet opening portion 132 is formed by connecting two semicircles Ch1 with straight lines Lh1. Semicircle Ch1 has the same curvature as the shape of the inlet opening portion 131. When viewed in the direction of nozzle hole axis Axh1, the nozzle holes 63 and 65 include the outlet opening portion 132 shaped into a track, namely, a non-circular shape (see FIG. 23). The nozzle holes 63 and 65 are defined as "non-circular nozzle holes." Where appropriate, the nozzle holes 63 and 65 are also denoted as "track nozzle holes." Radius R2 of semicircle Ch1 is equal to radius R1 of the inlet opening portion 131.

The nozzle holes 63 and 65 as non-circular nozzle holes allow the ratio of longest diameter a10 to shortest diameter b10 of the inlet opening portion 131, namely, the ellipticity of a10/b10, to be equal to 1 (see FIG. 23).

The nozzle holes 63 and 65 as non-circular nozzle holes allow the ratio of longest diameter a1 to shortest diameter 131 of the outlet opening portion 132, namely, the ellipticity of a1/b1, to be greater than 1 (see FIG. 23). According to the present embodiment, shortest diameter b10 of the inlet opening portion 131 is equal to shortest diameter b1 of the outlet opening portion 132. Nozzle hole open angles of the nozzle hole 63 and 65 determine distance X between the centers of two semicircles Ch1 forming the outlet opening portion 132.

Figure 24:
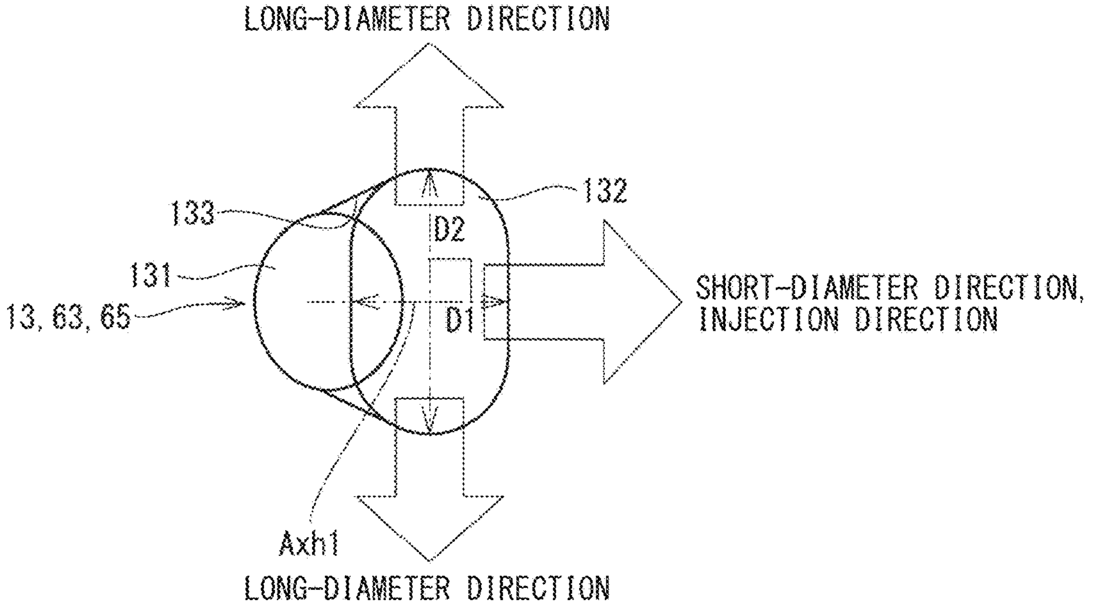
FIG. 24 is a schematic diagram illustrating a non-circular nozzle hole of the fuel injection valve according to the second embodiment.

As illustrated in FIG. 24, the nozzle holes 63 and 65 as non-circular nozzle holes are formed such that the short-diameter direction of the outlet opening portion 132 follows the injection direction of the fuel injected from the non-circular nozzle hole. When viewed in the direction of axis Ax1 of the nozzle cylinder portion 11, the "short-diameter direction" corresponds to the direction following the short diameter of the outlet opening portion 132, namely, direction D1 corresponding to the smallest width of the outlet opening portion 132. When viewed in the direction of axis Ax1 of the nozzle cylinder portion 11, the "fuel injection direction" corresponds to the direction following nozzle hole axis Axh1. In FIG. 24, the "long-diameter direction" corresponds to the direction following the long diameter of the outlet opening portion 132, namely, direction D2 corresponding to the largest width of the outlet opening portion 132.

The present embodiment defines virtual non-circular cone Vc2 for the nozzle holes 63 and 65 as non-circular nozzle holes similar to the non-circular nozzle holes according to the first embodiment. Therefore, all the six nozzle holes 13 are formed such that virtual circular cone Vc1 or virtual non-circular cone Vc2 does not interfere with virtual circular cone Vc1 or virtual non-circular cone Vc2.

The description below explains how to define nozzle hole axis Axh1 for a "non-circular nozzle hole" or a "track nozzle hole."

Step 1

Figure 25:
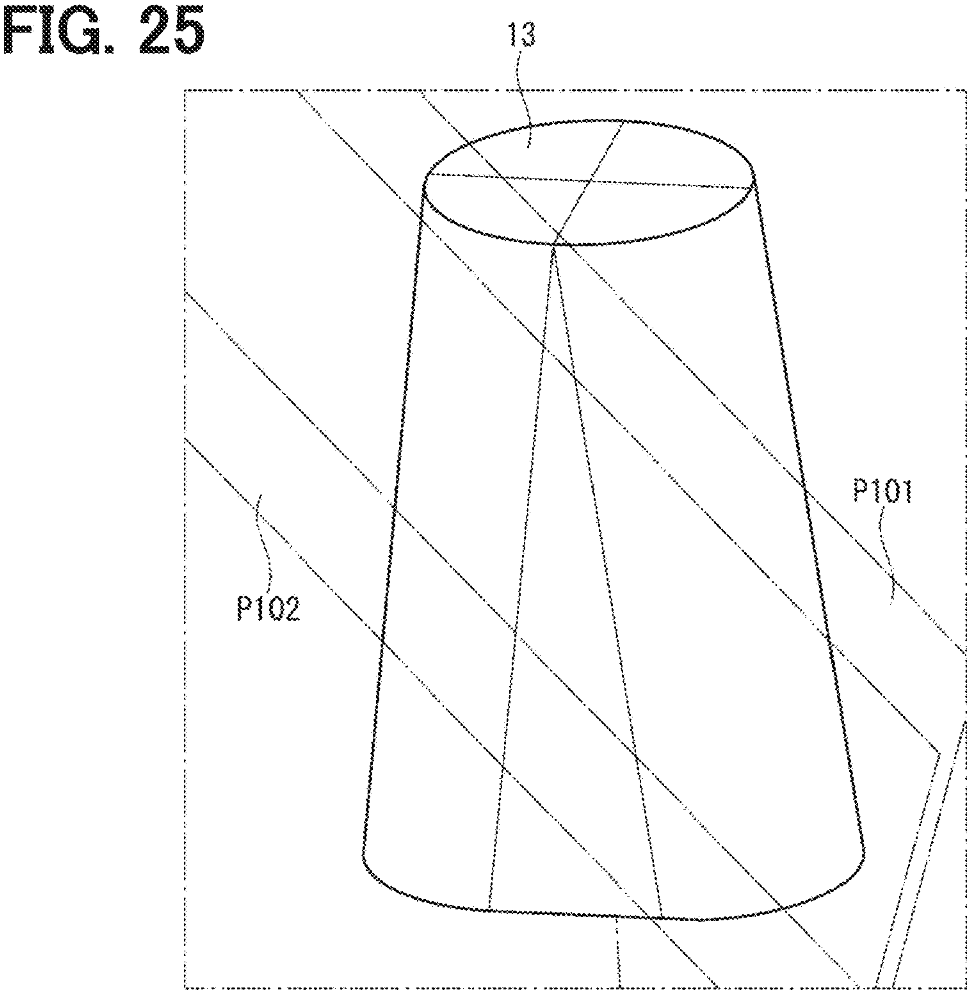
FIG. 25 is a diagram illustrating how to define a nozzle hole axis of the non-circular nozzle hole of the fuel injection valve according to the second embodiment.

As illustrated in FIG. 25, cut the nozzle hole 13 on two appropriate parallel planes P101 and P102.

Step 2

Figure 26:
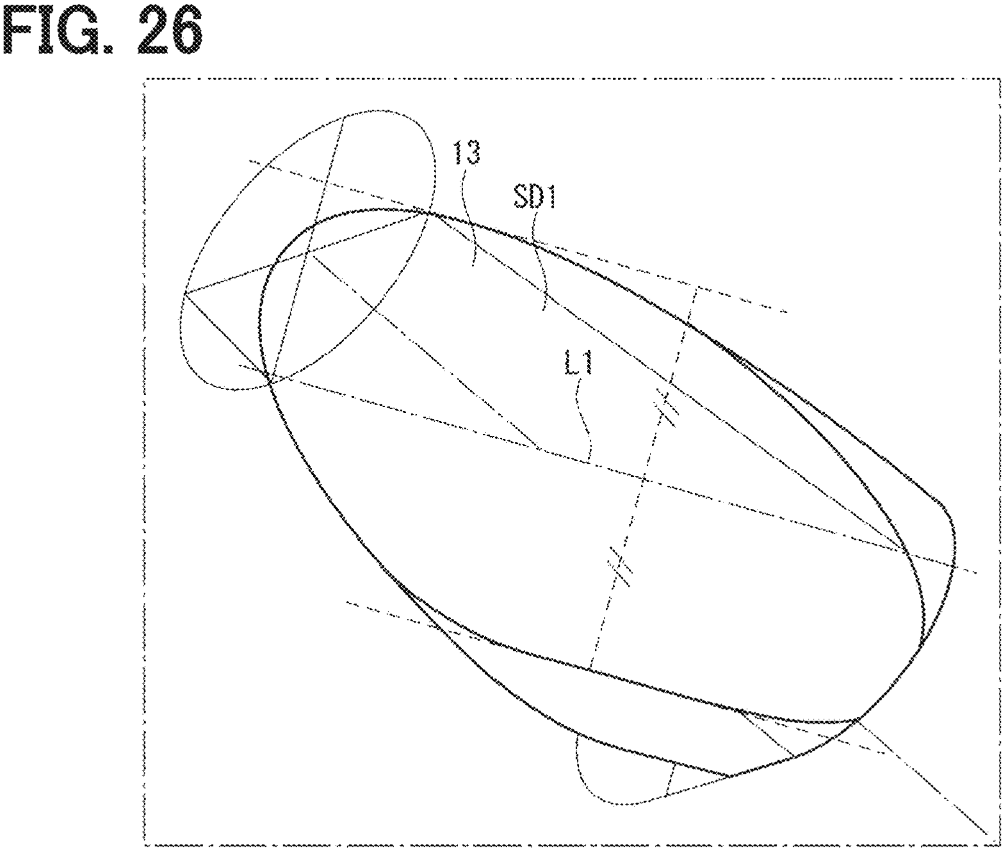
FIG. 26 is a diagram illustrating how to define a nozzle hole axis of the non-circular nozzle hole of the fuel injection valve according to the second embodiment.
Figure 27:
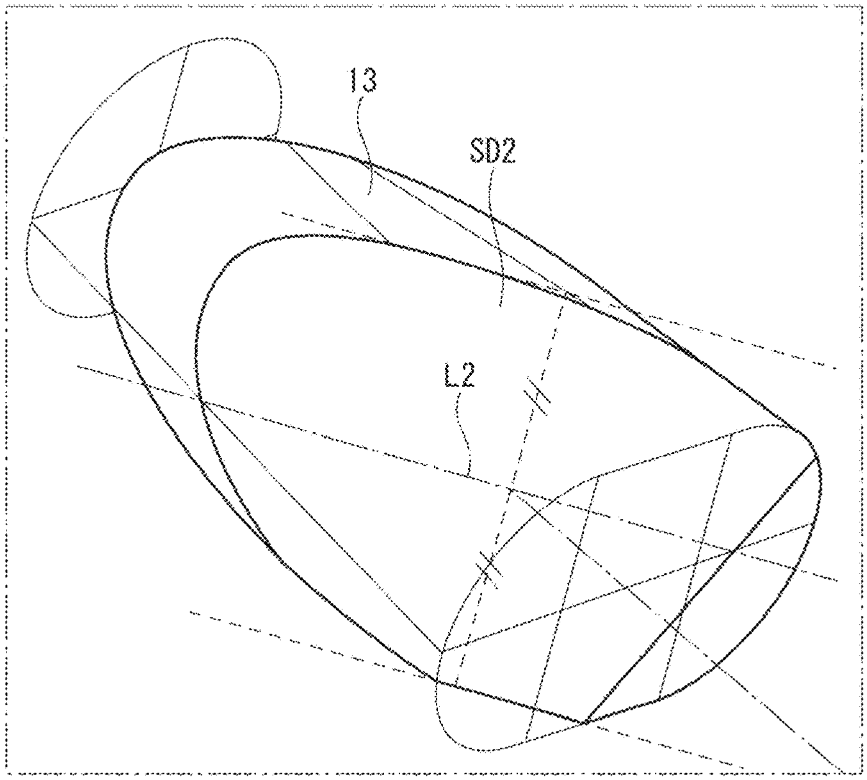
FIG. 27 is a diagram illustrating how to define a nozzle hole axis of the non-circular nozzle hole of the fuel injection valve according to the second embodiment.

As illustrated in FIGS. 26 and 27, suppose lines L1 and L2 parallel to and equidistant from the two lines at the outer edges of cross-sections SD1 and SD2 of the nozzle hole 13 that is cut at step 1.

Step 3

Figure 28:
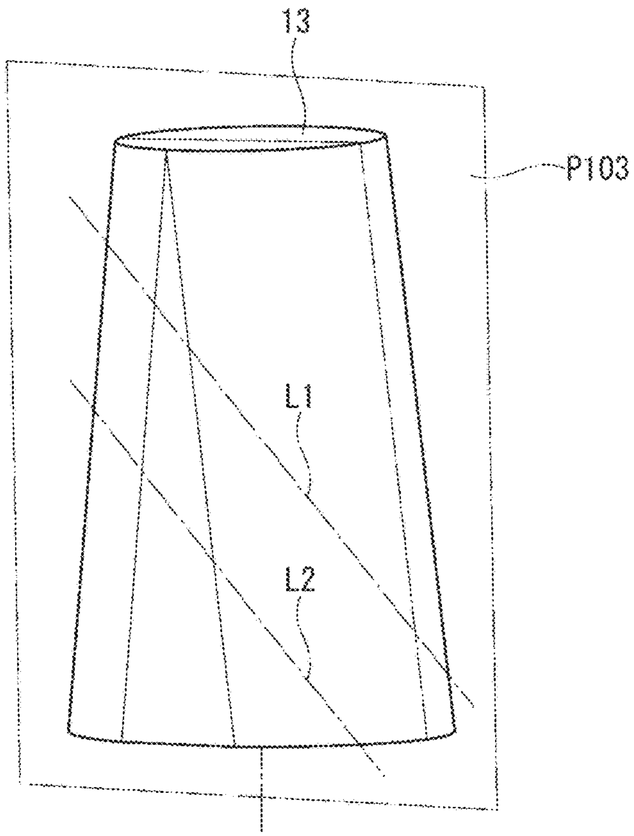
FIG. 28 is a diagram illustrating how to define a nozzle hole axis of the non-circular nozzle hole of the fuel injection valve according to the second embodiment.
Figure 29:
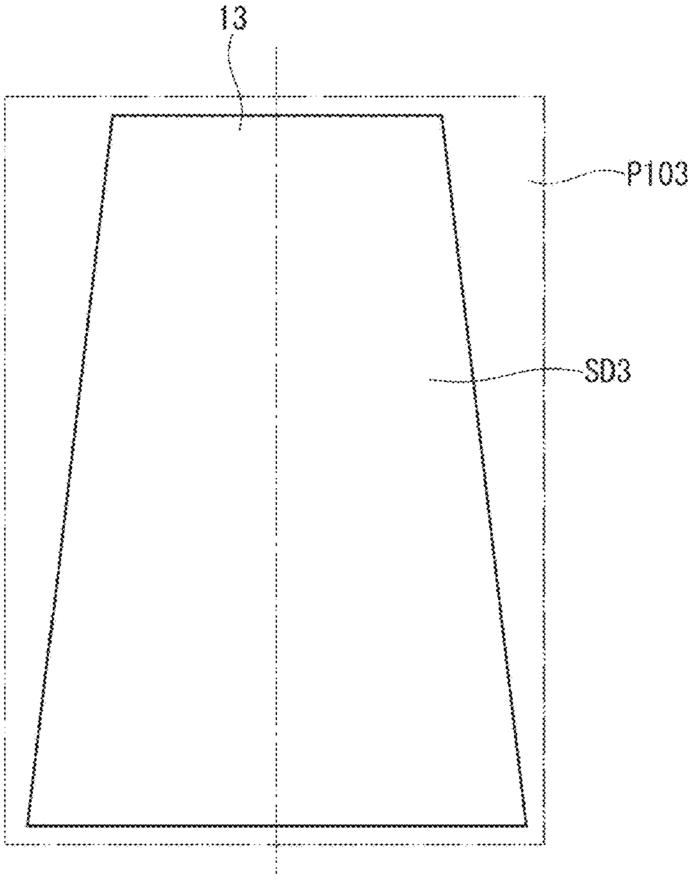
FIG. 29 is a diagram illustrating how to define a nozzle hole axis of the non-circular nozzle hole of the fuel injection valve according to the second embodiment.

As illustrated in FIGS. 28 and 29, cut the nozzle hole 13 on plane P103 including lines L1 and L2 supposed at step 2.

Step 4

Figure 30:
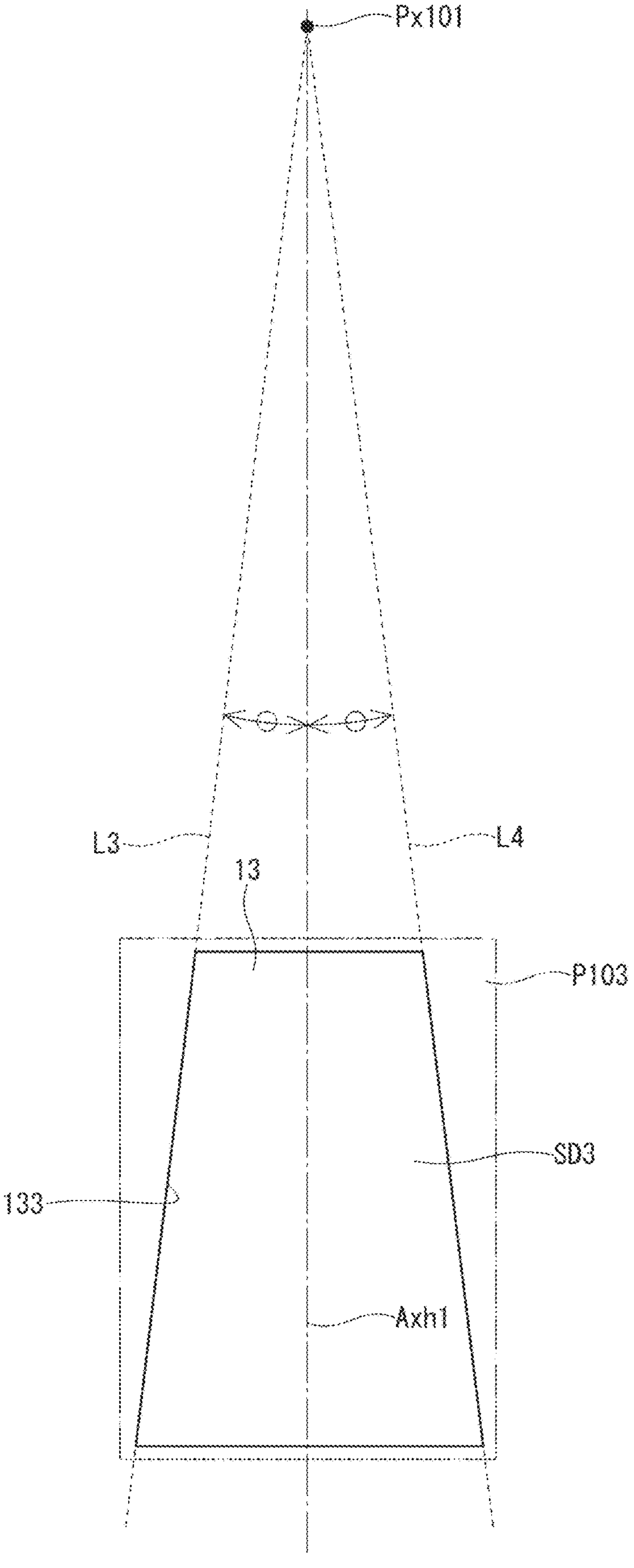
FIG. 30 is a diagram illustrating how to define a nozzle hole axis of the non-circular nozzle hole of the fuel injection valve according to the second embodiment.

As illustrated in FIG. 30, suppose lines L3 and L4 by extending the sides corresponding to the nozzle hole inner walls 133 out of the outer edges of cross-section SD3 of the nozzle hole 13 that is cut at step 3. Suppose intersection point Px101 between lines L3 and L4. Then, nozzle hole axis Axh1 corresponds to the line passing through intersection point Px101 and positions equidistant from lines L3 and L4.

Figure 31:
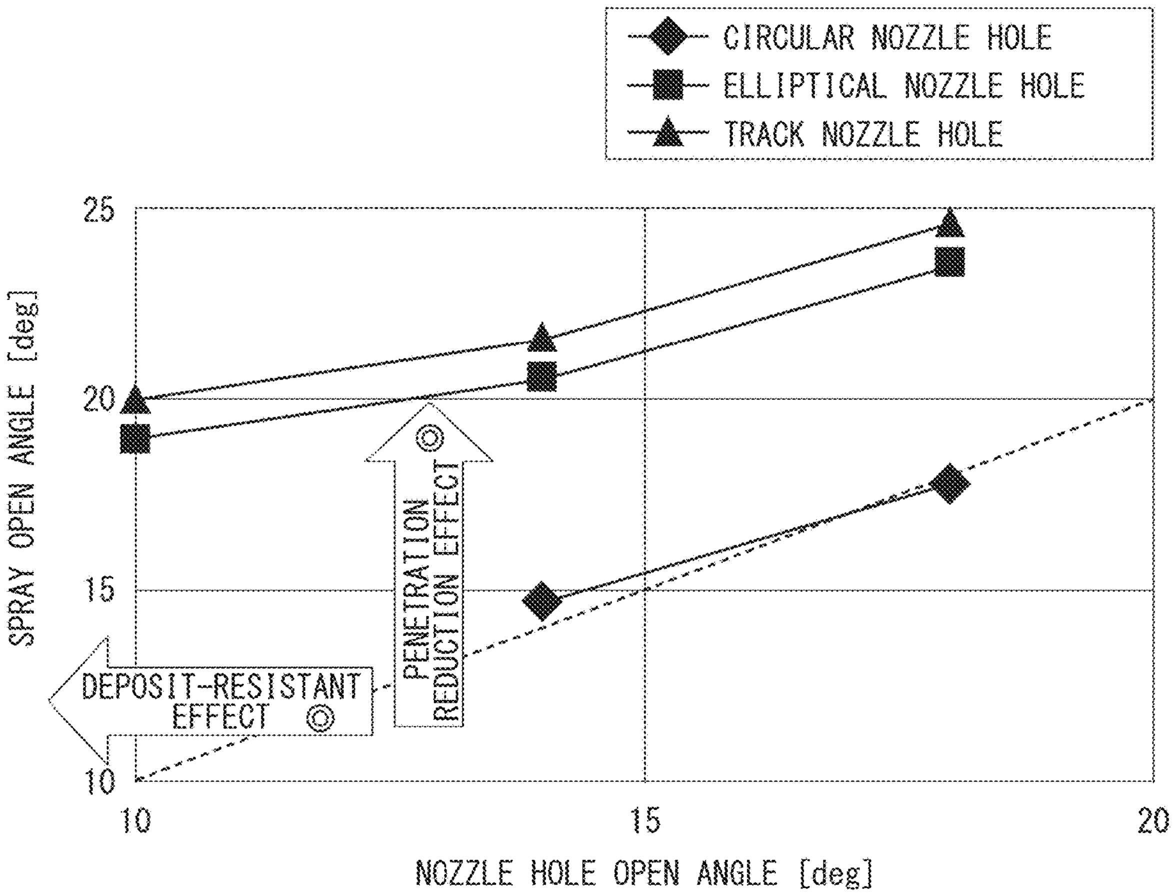
FIG. 31 is a diagram illustrating the relationship between a "nozzle hole open angle" and a "spray open angle" of the fuel injection valve according to the second embodiment.

As illustrated in FIG. 31, the spray open angle of the fuel injected from the track nozzle hole is larger than the spray open angle of the fuel injected from the elliptical nozzle hole. Therefore, the track nozzle hole can more effectively reduce the fuel spray penetration than the elliptical nozzle hole.

According to the present embodiment as above, one or more non-circular nozzle holes (63, 65) each include the inlet opening portion 131 shaped into a perfect circle. The outlet opening portion 132 is formed by connecting two semicircles Ch1 with line Lh1 under the condition that semicircle Ch1 has the same curvature as the shape of the inlet opening portion 131. Compared to the elliptical nozzle hole, it is possible to increase the curvature radius of the corner on the outer edge of the outlet opening portion 132 and easily eliminate the fuel from the corner. It is possible to inhibit wetting at the tip of the nozzle 10.

Third Embodiment

Figure 32:
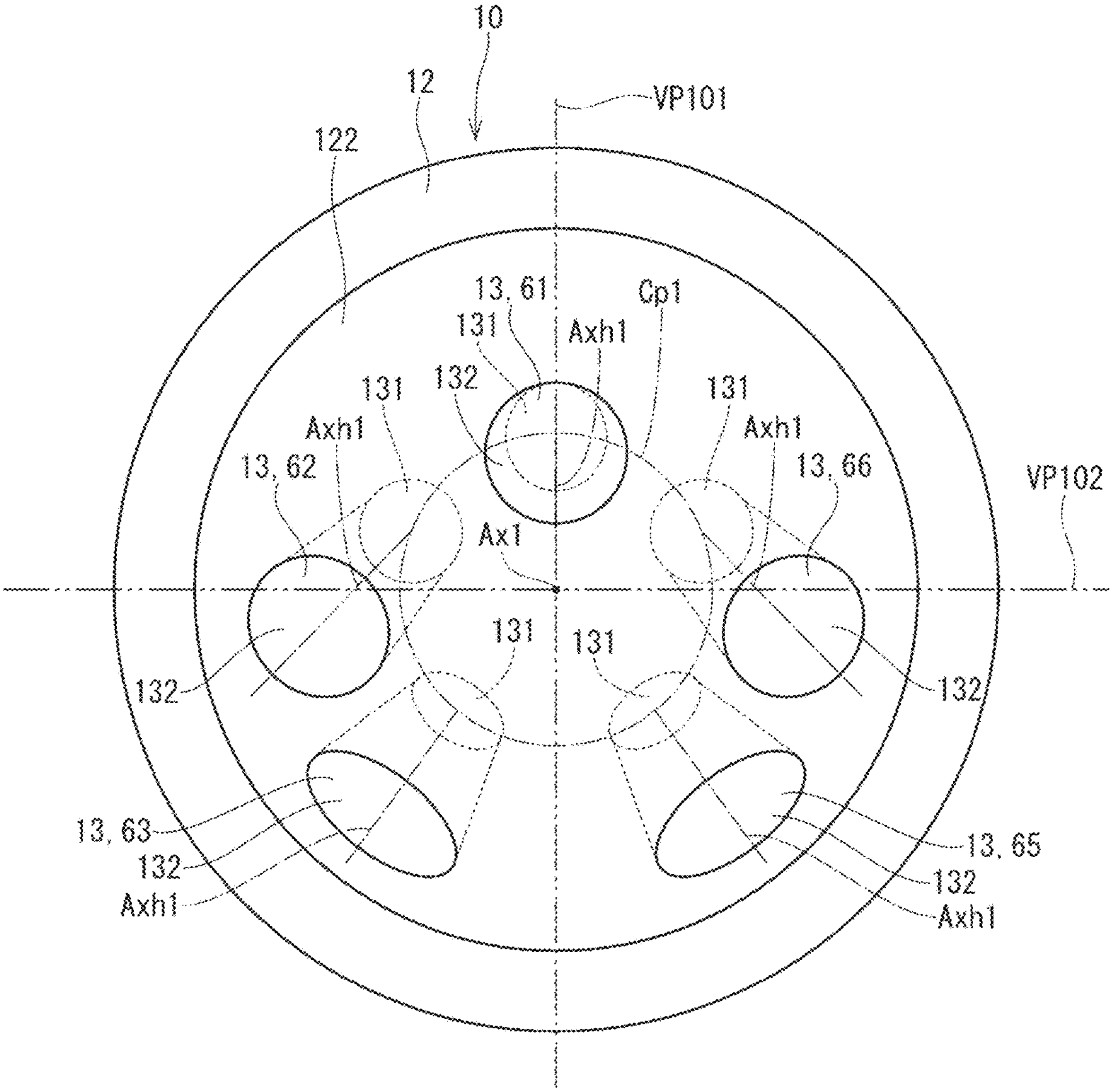
FIG. 32 is a diagram illustrating a nozzle bottom portion and a nozzle hole of the fuel injection valve according to a third embodiment.

The description below explains the fuel injection valve according to the third embodiment based on FIG. 32. The third embodiment differs from the first embodiment in the configuration of the nozzle hole 13.

According to the present embodiment, the nozzle 10 does not include the nozzle hole 64 described in the first embodiment. According to the present embodiment, five nozzle holes 13 are formed in the nozzle 10. The centers of the inlet opening portions 131 of the nozzle holes 61, 62, 63, 65, and 66 are evenly spaced on pitch circle Cp1 around axis Ax1.

Fourth Embodiment

Figure 33:
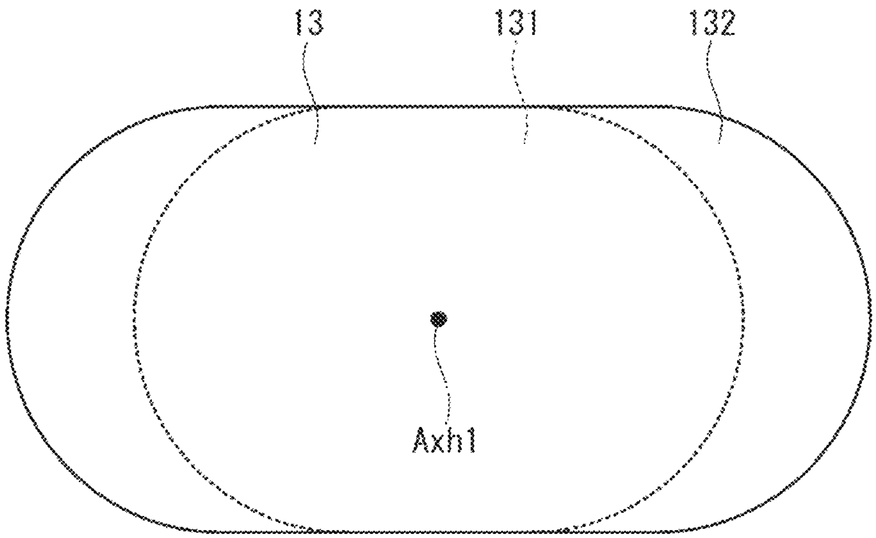
FIG. 33 is a diagram illustrating a non-circular nozzle hole of the fuel injection valve according to a fourth embodiment.

The description below explains the fuel injection valve according to the fourth embodiment based on FIG. 33. The fourth embodiment differs from the second embodiment in the configuration of the nozzle hole 13 as a non-circular nozzle hole.

According to the present embodiment, the nozzle hole 13 as a non-circular nozzle hole includes the inlet opening portion 131 and the outlet opening portion 132 both shaped into trucks. The definition of "track shape" complies with that described in the second embodiment.

The present embodiment can further increase the fuel spray angle by flattening the inlet opening portion 131.

Fifth Embodiment

Figure 34:
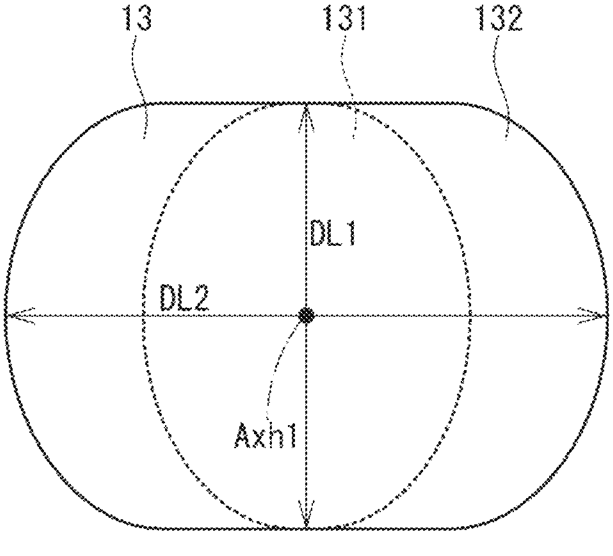
FIG. 34 is a diagram illustrating a non-circular nozzle hole of the fuel injection valve according to a fifth embodiment.

The description below explains the fuel injection valve according to the fifth embodiment based on FIG. 34. The fifth embodiment differs from the first embodiment in the configuration of the nozzle hole 13 as a non-circular nozzle hole.

According to the present embodiment, the nozzle hole 13 as a non-circular nozzle hole includes the inlet opening portion 131 shaped into an ellipse and the outlet opening portion 132 shaped into a track. The inlet opening portion 131 is formed such that direction DL1 of the major axis is orthogonal to direction DL2 of the long diameter of the outlet opening portion 132. In more detail, the outlet opening portion 132 is shaped into a track such that the ellipse of inlet opening portion 131 is bisected in the minor axis direction and the ends are connected by lines.

The present embodiment can increase the smallest curve of the outlet opening portion 132 and smoothly connect the nozzle hole inner walls.

Sixth Embodiment

Figure 35:
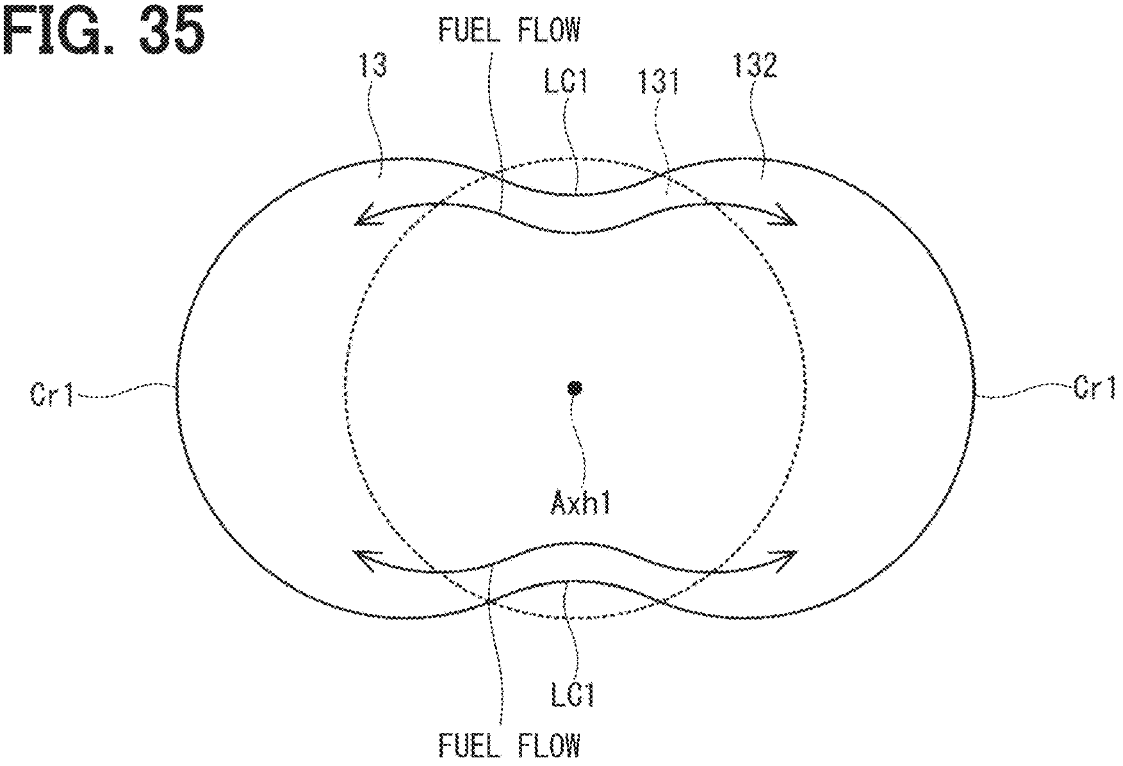
FIG. 35 is a diagram illustrating a non-circular nozzle hole of the fuel injection valve according to a sixth embodiment.

The description below explains the fuel injection valve according to the sixth embodiment based on FIG. 35. The sixth embodiment differs from the first embodiment in the configuration of the nozzle hole 13 as a non-circular nozzle hole.

According to the present embodiment, the nozzle hole 13 as a non-circular nozzle hole includes the inlet opening portion 131 shaped into a perfect circle. The outlet opening portion 132 is formed by connecting parts of two perfect circles Cr1 with two curves LC1 under the condition that perfect circle Cr1 has the same curvature as the shape of inlet opening portion 131.

According to the present embodiment, the guide in the opening direction of the nozzle hole 13 allows the fuel to flow along the nozzle hole inner wall. It is possible to further increase the fuel spray angle.

Seventh Embodiment

Figure 36:
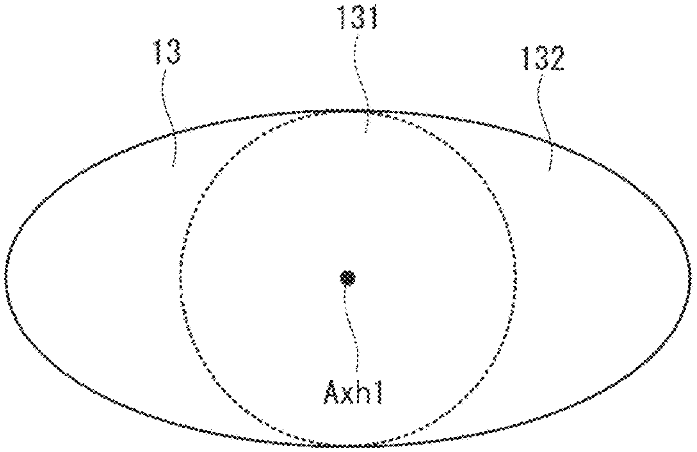
FIG. 36 is a diagram illustrating a non-circular nozzle hole of the fuel injection valve according to a seventh embodiment.

The description below explains the fuel injection valve according to the seventh embodiment based on FIG. 36. The seventh embodiment differs from the first embodiment in the configuration of the nozzle hole 13 as a non-circular nozzle hole.

According to the present embodiment, the nozzle hole 13 as a non-circular nozzle hole includes the inlet opening portion 131 shaped into a perfect circle and the outlet opening portion 132 shaped into an ellipse.

The present embodiment can increase the fuel spray angle and adjust the fuel flow rate by flattening the outlet opening portion 132.

Eighth Embodiment

Figure 37:
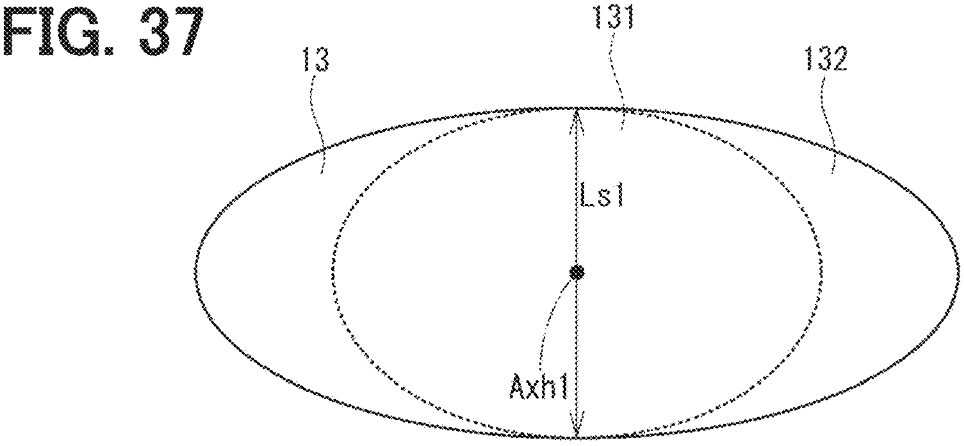
FIG. 37 is a diagram illustrating a non-circular nozzle hole of the fuel injection valve according to an eighth embodiment.

The description below explains the fuel injection valve according to the eighth embodiment based on FIG. 37. The eighth embodiment differs from the first embodiment in the configuration of the nozzle hole 13 as a non-circular nozzle hole.

According to the present embodiment, the nozzle hole 13 as a non-circular nozzle hole includes the inlet opening portion 131 and the outlet opening portion 132, each shaped into an ellipse. The inlet opening portion 131 and the outlet opening portion 132 have the same length of the short diameter, namely, the minor axis set to Ls1.

The present embodiment can further increase the fuel spray angle by flattening the inlet opening portion 131 and the outlet opening portion 132.

Ninth Embodiment

Figure 38:
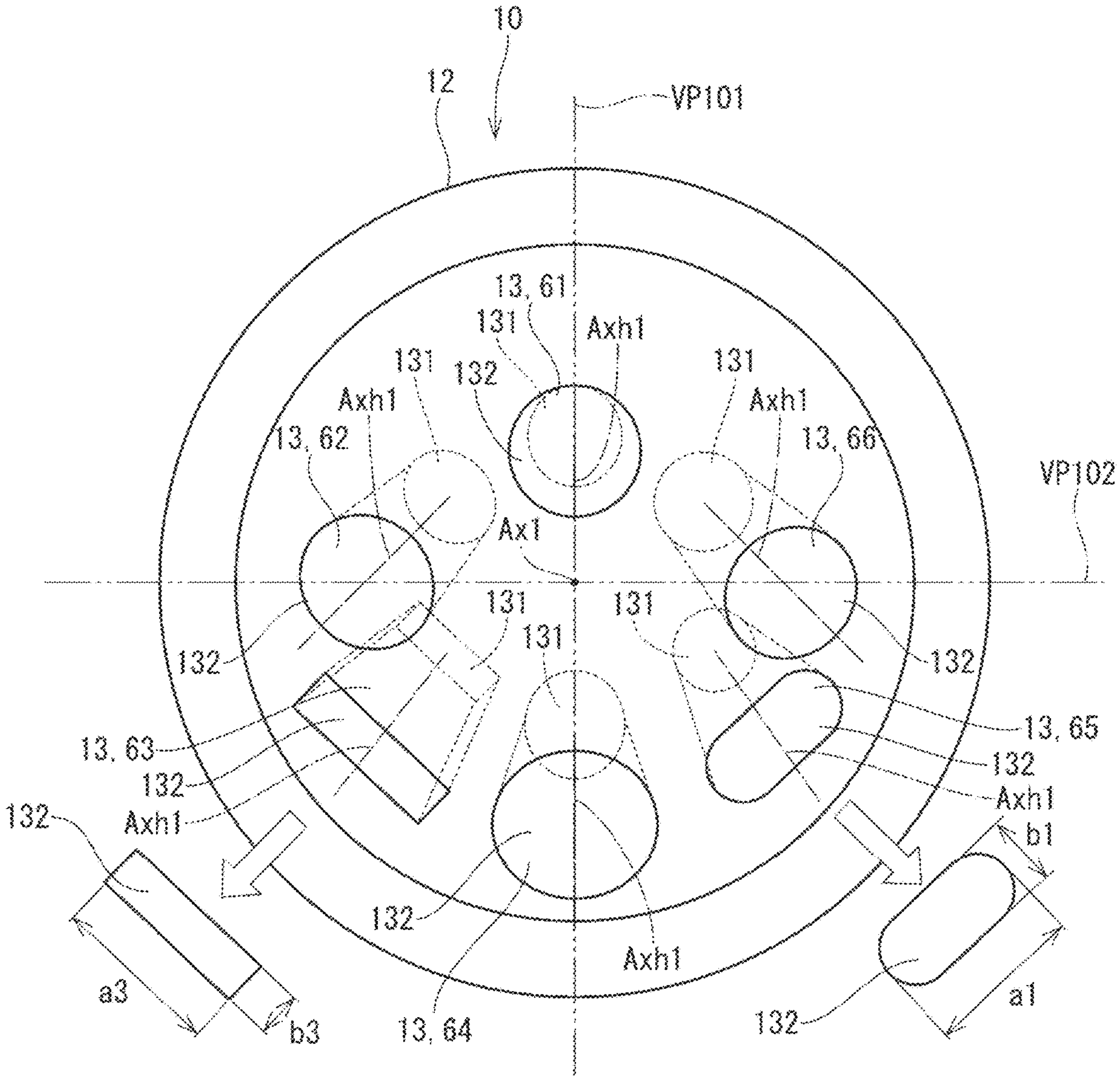
FIG. 38 is a diagram illustrating a nozzle bottom portion and a nozzle hole of the fuel injection valve according to a ninth embodiment.

FIG. 38 partially illustrates the fuel injection valve according to the ninth embodiment. The ninth embodiment differs from the first embodiment in the configuration of the nozzle hole 13 as a non-circular nozzle hole.

According to the present embodiment, the nozzle hole 63 as a non-circular nozzle hole is formed such that the inlet opening portion 131 and the outlet opening portion 132 are each shaped into a rectangle. The nozzle hole 63 allows the ratio between length a3 of the long side and length b3 of the short side of the outlet opening portion 132, namely, the ellipticity of a3/b3, to be greater than 1.

The nozzle hole 65 as a non-circular nozzle hole includes the inlet opening portion 131 shaped into a perfect circle and the outlet opening portion 132 shaped into a track. The nozzle hole 65 allows the ratio between length a1 of the long diameter and length 131 of the short diameter of the outlet opening portion 132, namely, the ellipticity of a1/b1, to be greater than 1. The nozzle hole 65 is configured equally to the nozzle hole 65 according to the second embodiment.

Tenth Embodiment

Figure 39:
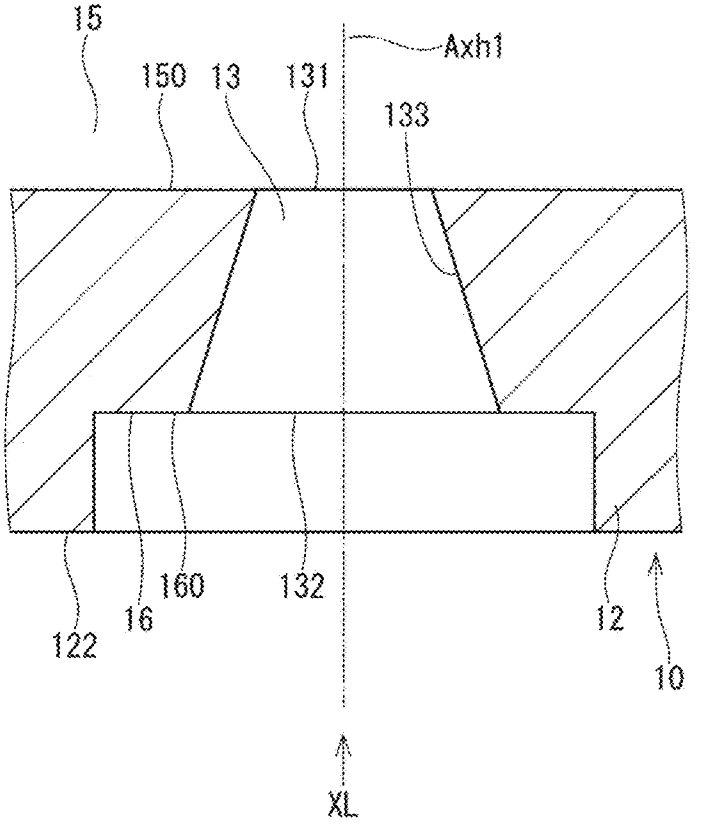
FIG. 39 is a sectional view including the non-circular nozzle hole of the fuel injection valve according to a tenth embodiment.
Figure 40:
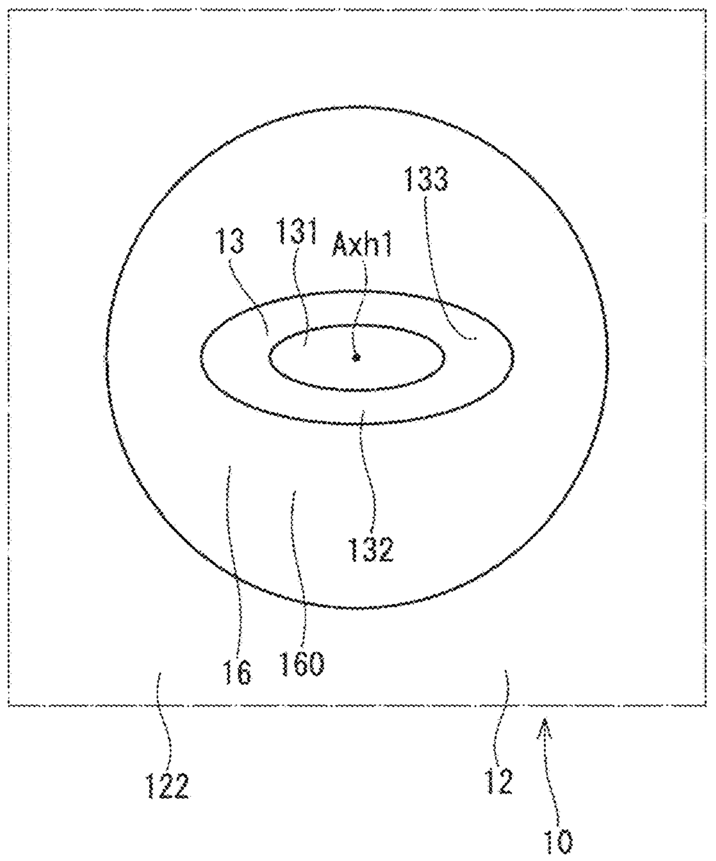
FIG. 40 is a diagram illustrating FIG. 39 viewed in the direction of arrow XL.

FIGS. 39 and 40 partially illustrate the fuel injection valve according to the tenth embodiment. The tenth embodiment differs from the first embodiment in the configuration of the nozzle hole 13.

According to the present embodiment, the nozzle 10 is formed with a concave nozzle portion 16. The concave nozzle portion 16 is formed to provide a circular concave from the surface 122 of the nozzle bottom portion 12 opposite from the nozzle cylinder portion 11 toward the nozzle cylinder portion 11 (see FIGS. 39 and 40).

The nozzle hole 13 as a non-circular nozzle hole is formed to connect the suction wall surface 150 with a bottom surface 160 of the concave nozzle portion 16. The inlet opening portion 131 of the nozzle hole 13 is formed on the suction wall surface 150 of the nozzle bottom portion 12 on the side of the nozzle cylinder portion 11. The outlet opening portion 132 of the nozzle hole 13 is formed on the bottom surface 160 of the nozzle bottom portion 12 opposite from the nozzle cylinder portion 11.

As illustrated in FIG. 40, the inlet opening portion 131 and the outlet opening portion 132 are elliptical. The inlet opening portion 131 and the outlet opening portion 132 are formed into elliptical shapes having the same ellipticity. The opening of the concave nozzle portion 16 is shaped into a perfect circle on the surface 122. On the surface 122, the opening of the concave nozzle portion 16 may be shaped into not only a perfect circle, but also an imperfect circle, an oval, or an ellipse having the same ellipticity as the outlet opening portion 132. The freedom of placement can be ensured by increasing the area of the opening of the concave nozzle portion 16.

Eleventh Embodiment

Figure 41:
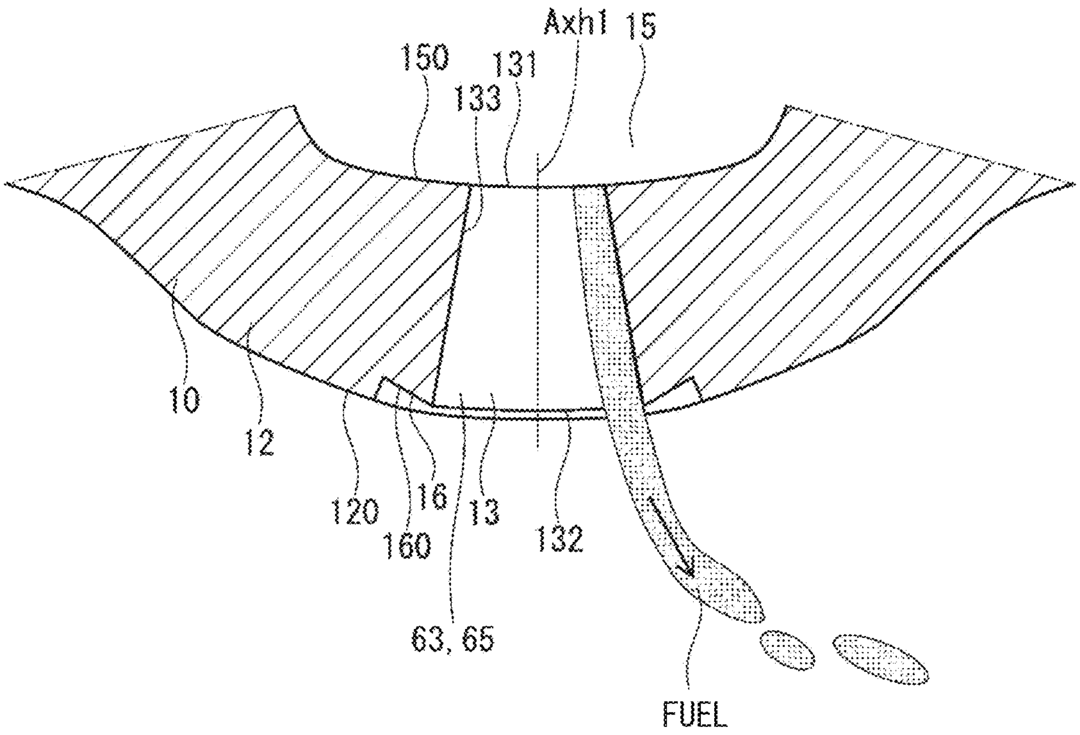
FIG. 41 is a sectional view illustrating a non-circular nozzle hole of the fuel injection valve according to an eleventh embodiment.

FIG. 41 partially illustrates the fuel injection valve according to the eleventh embodiment. The eleventh embodiment differs from the tenth embodiment in the configuration of the nozzle hole 13.

The present embodiment differs from the tenth embodiment in the shape of the concave nozzle portion 16. According to the present embodiment, the bottom surface 160 of the concave nozzle portion 16 is tapered to depart from nozzle hole axis Axh1 in the direction from the outlet opening portion 132 to the inlet opening portion 131 along nozzle hole axis Axh1. In terms of the cross-section along the virtual plane including nozzle hole axis Axh1, it is possible to increase the angle formed between the nozzle hole inner wall 133 and the bottom surface 160, namely, an exit angle, compared to the tenth embodiment. When injected, the fuel is hardly attracted to the outer wall of the nozzle bottom portion 12 due to surface tension. It is possible to inhibit wetting on the outer wall of the nozzle bottom portion 12.

Twelfth Embodiment

Figure 42:
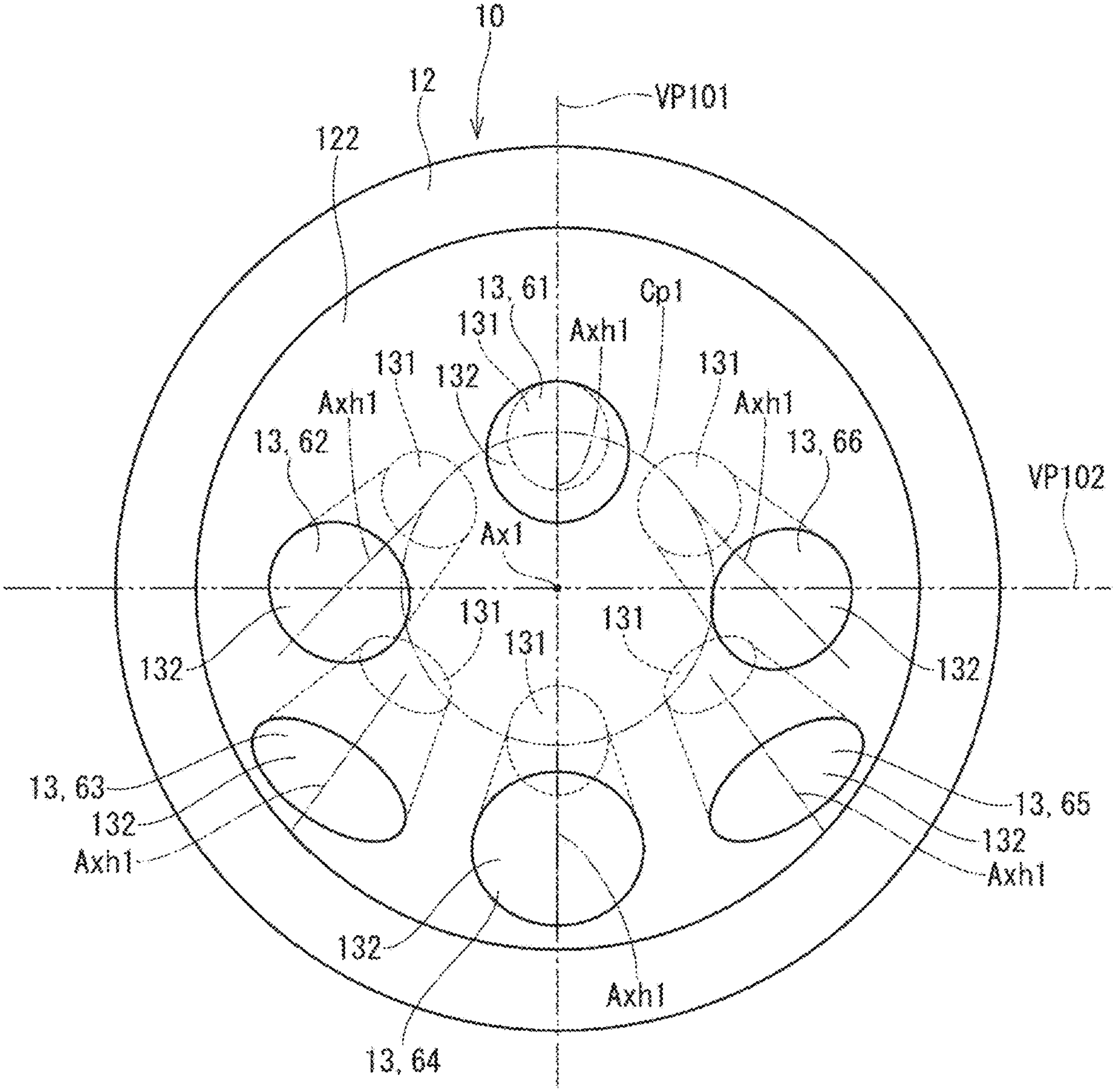
FIG. 42 is a diagram illustrating a nozzle bottom portion and a nozzle hole of the fuel injection valve according to a twelfth embodiment.

FIG. 42 partially illustrates the fuel injection valve according to the twelfth embodiment. The twelfth embodiment differs from the first embodiment in the configuration of the nozzle hole 13.

According to the present embodiment, the centers of the inlet opening portions 131 for the nozzle holes 61, 62, 64, and 66 as circular nozzle holes are placed on pitch circle Cp1 around axis Ax1. The centers of the inlet opening portions 131 for the nozzle holes 63 and 65 as non-circular nozzle holes are placed outside pitch circle Cp1.

Thirteenth Embodiment

Figure 43:
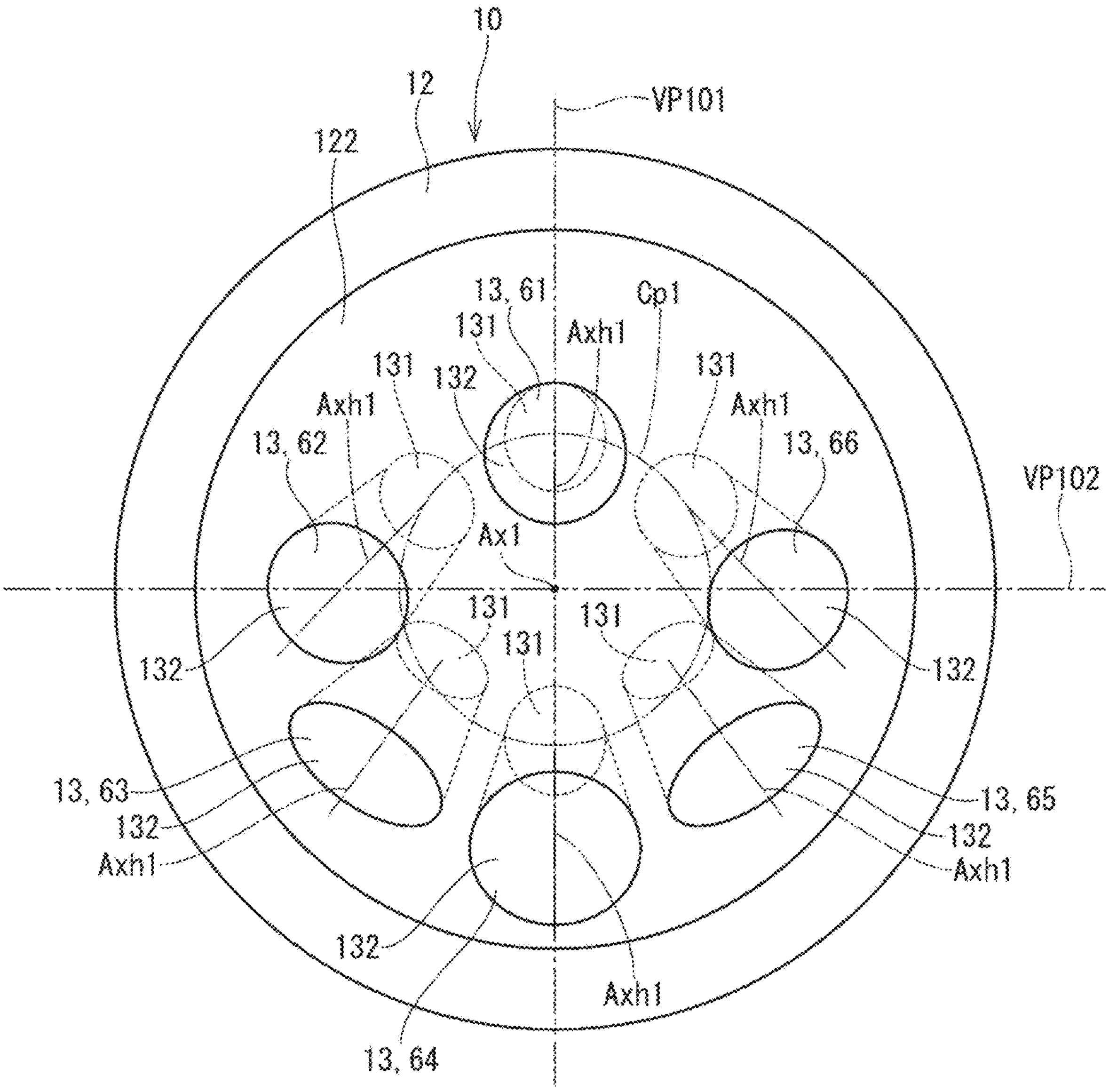
FIG. 43 is a diagram illustrating a nozzle bottom portion and a nozzle hole of the fuel injection valve according to a thirteenth embodiment.

FIG. 43 partially illustrates the fuel injection valve according to the thirteenth embodiment. The thirteenth embodiment differs from the first embodiment in the configuration of the nozzle hole 13.

According to the present embodiment, the centers of the nozzle opening portions 131 of the nozzle holes 61, 62, 64, and 66 as circular nozzle holes are placed on pitch circle Cp1 around axis Ax1. The centers of the inlet opening portions 131 of the nozzle holes 63 and 65 as non-circular nozzle holes are placed inside pitch circle Cp1.

Fourteenth Embodiment

Figure 44:
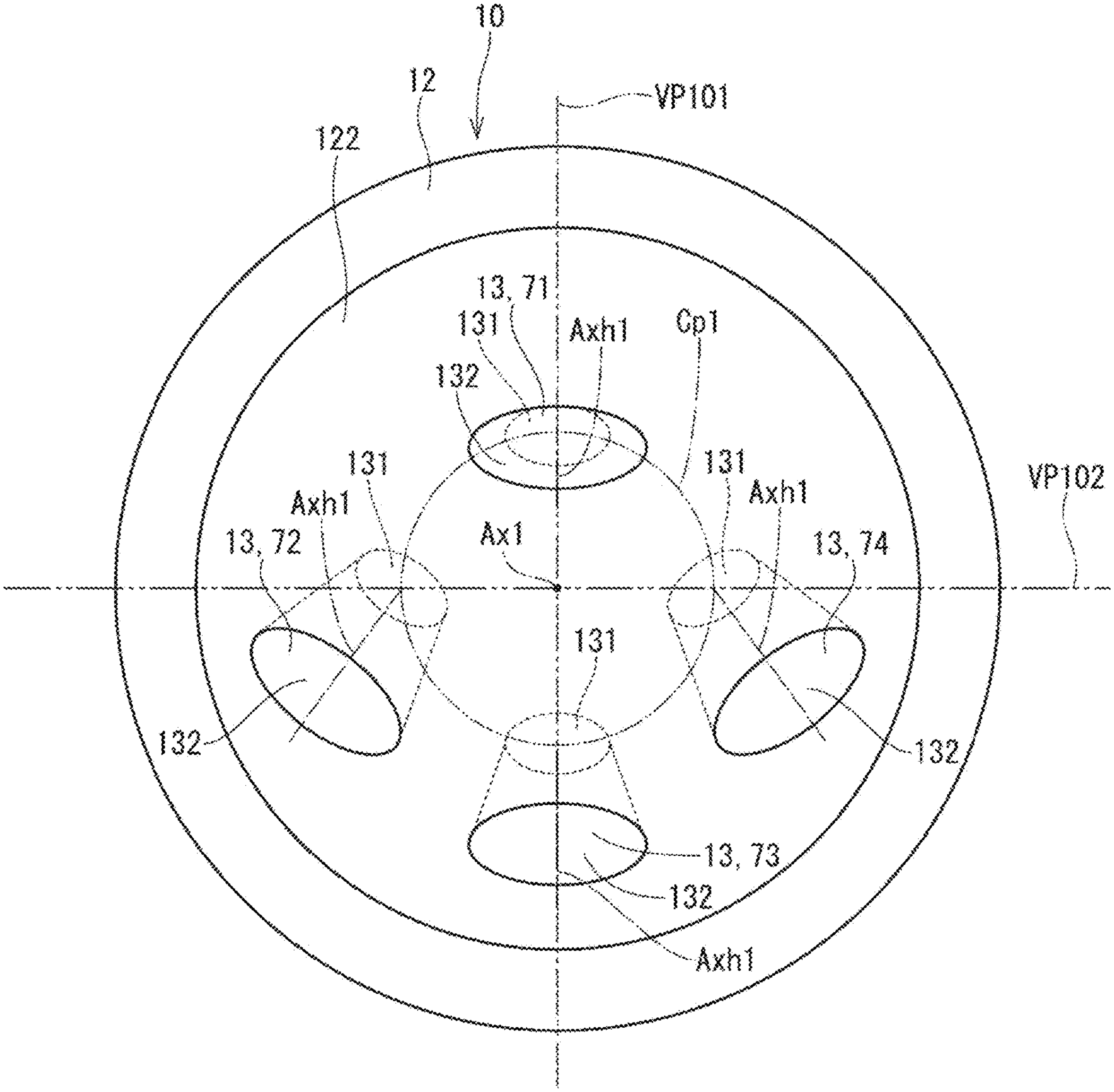
FIG. 44 is a diagram illustrating a nozzle bottom portion and a nozzle hole of the fuel injection valve according to a fourteenth embodiment.

FIG. 44 partially illustrates the fuel injection valve according to the fourteenth embodiment. The fourteenth embodiment differs from the first embodiment in the configuration of the nozzle hole 13.

The present embodiment forms four nozzle holes 13 in the nozzle bottom portion 12. The four nozzle holes 13 are denoted as nozzle holes 71, 72, 73, and 74 for the sake of explanation. According to the present embodiment, the nozzle holes 71, 72, 73, and 74 are non-circular similar to the nozzle holes 63 and 65 according to the first embodiment. According to the present embodiment, all the nozzle holes 13 are non-circular. The centers of the inlet opening portions 131 of the nozzle holes 71, 72, 73, and 74 are evenly spaced on pitch circle Cp1 around axis Ax1.

As above, the present embodiment can inhibit the accumulation of deposit on the nozzle hole inner wall 133 by using the nozzle holes 13 as non-circular nozzle holes that allow the ratio of the longest diameter to the shortest diameter of the outlet opening portion 132 to be greater than 1.

Virtual non-circular cone Vc2 is defined for the non-circular nozzle hole. At least two adjacent nozzle holes 13 are formed such that virtual non-circular cones Vc2 do not interfere with each other. It is possible to inhibit the interference between fuel sprays injected from the nozzle holes 13. It is possible to inhibit an increased spray penetration from wetting inside the cylinder and deteriorating the spraying characteristics.

Other Embodiments

According to the first embodiment described above, two of the six nozzle holes are non-circular and the four nozzle holes are circular. According to the other embodiments, one or more of the nozzle holes may be non-circular. As described in the fourteenth embodiment, all the nozzle holes may be non-circular. In this case, at least two adjacent nozzle holes are formed such that the corresponding virtual non-circular cones do not interfere with each other.

According to the first embodiment described above, the outlet opening portion of the non-circular nozzle hole is shaped into an accurate ellipse having two focal points. According to the other embodiments, the non-circular nozzle hole is not limited to using the outlet opening portion shaped into an exact oval with two focal points if the outlet opening portion allows the ratio of the longest diameter to the shortest diameter to be greater than 1. The outlet opening portion may be shaped into not only an exact oval but also any shape such as a polygon or a shape composed of regions closed by a curve. According to the other embodiments, the nozzle may include not only six nozzle holes but also one to five or seven or more nozzle holes.

According to the first embodiment described above, the nozzle holes 13 include the inlet opening portions 131 having different areas. According to the other embodiments, however, all the nozzle holes 13 may include the inlet opening portions 131 having the same area.

According to the other embodiments, at least two adjacent nozzle holes just need to be formed such that the virtual non-circular cone does not interfere with the virtual circular cone or the virtual non-circular cone. The other nozzle holes may be formed such that the virtual non-circular interferes with the virtual circular cone or the virtual non-circular cone.

The above-described embodiments assume average pressure P (MPa) of the fuel in the fuel passage to be 20 (MPa) when the fuel is injected from the nozzle hole. According to the other embodiments, however, P may be lower than or higher than 20 if the multiple nozzle holes are formed to satisfy the relationships expressed by equations 1 through 3 above. The nozzle holes can be formed as appropriate according to fuel pressures in the fuel passage that are estimated when the fuel injection valve is used.

According to other embodiments, the non-circular nozzle holes may not be formed such that the short-diameter direction of the outlet opening portion follows the injection direction of the fuel injected from the non-circular nozzle hole.

According to the other embodiments, the fuel injection valve may be mounted on the engine 80 in any orientation.

According to the other embodiments, the nozzle cylinder portion and the nozzle bottom portion of the nozzle may be formed separately. According to the other embodiments, the first cylinder member 21 of the housing 20 and the nozzle or the nozzle cylinder portion may be integrally formed.

The other embodiments may integrally form the first cylinder member 21, the second cylinder member 22, and the third cylinder member 23 of the housing 20. In this case, the second cylinder member 22 can be thinned to provide a magnetic flux adjustment portion, for example.

According to the above-described embodiments, the fuel injection valve is sideways installed on the engine. However, the other embodiments may place the spark plug and the fuel injection valve adjacent to each other at the center of the cylinder head based on a so-called center installation.

According to the above-described embodiments, the fuel injection valve is used for direct injection type gasoline engines. According to the other embodiments, the fuel injection valve may be used for diesel engines and port injection type gasoline engines, for example.

The present disclosure is not limited to the above-mentioned embodiments but may be variously modified without departing from the spirit and scope of the invention.

The present disclosure has been described based on the embodiments. However, the present disclosure is not limited to the embodiments and the structures. The present disclosure includes various modifications and those within a comparable scope. The category and the scope of the idea of the present disclosure also cover various combinations and forms as well as the other combinations and forms including only one element or more or less in the former.

What is claimed is:

1. A fuel injection valve comprising:

a nozzle that includes a nozzle cylinder portion forming a fuel passage therein, a nozzle bottom portion closing one end of the nozzle cylinder portion, a plurality of nozzle holes connecting a surface of the nozzle bottom portion on a side of the nozzle cylinder portion with a surface on an opposite side from the nozzle cylinder portion to inject fuel in the fuel passage, and an annular valve seat formed around the nozzle holes on the surface of the nozzle bottom portion on the side of the nozzle cylinder portion;

a needle that is reciprocally movable inside the nozzle, the needle configured to contact with the valve seat to close the nozzle holes and to separate from the valve seat to open the nozzle holes; and a drive unit that is configured to move the needle in one of a valve opening direction and a valve closing direction, wherein a nozzle hole of the plurality of nozzle holes includes an inlet opening portion formed on the surface of the nozzle bottom portion on the side of the nozzle cylinder portion, an outlet opening portion formed on the surface of the nozzle bottom portion on the opposite side from the nozzle cylinder portion, and a nozzle hole inner wall connecting the inlet opening portion with the outlet opening portion, an area of the outlet opening portion is larger than an area of the inlet opening portion, at least one of the nozzle holes of the plurality of nozzle holes is a non-circular nozzle hole in which a ratio of a longest diameter to a shortest diameter of the outlet opening portion is greater than 1, and at least another one of the nozzle holes of the plurality of nozzle holes is a circular nozzle hole, a virtual circular cone is defined as a virtual cone having a vertex, which is an intersection point between a nozzle hole axis of the circular nozzle hole and the outlet opening portion, and two generatrices, which are in a cross-section along a first virtual plane including the nozzle hole axis of the circular nozzle hole, forming $$\theta f=\theta+0.5\times P\hat{}0.6$$

as an angle therebetween, in which

θ (deg) is a nozzle hole open angle of the circular nozzle hole of the plurality of nozzle holes and in which the ratio of the longest diameter to the shortest diameter of the outlet opening portion is equal to 1, θf (deg) is a spray open angle of fuel to be injected from the circular nozzle hole, and P (MPa) is an average pressure of the fuel in the fuel passage when the fuel is injected from the circular nozzle hole, a virtual non-circular cone is defined as a virtual cone having a vertex, which is an intersection point between the nozzle hole axis of the non-circular nozzle hole and the outlet opening portion, two generatrices, which are in a cross-section along a second virtual plane including the nozzle hole axis of the non-circular nozzle hole, forming $$\theta f1=\theta 1+0.5\times P\hat{}0.6+17\times e\hat{}(-0.13\times\theta 1)$$

as a largest angle therebetween, and two generatrices, which are in a cross-section along a third virtual plane that includes the nozzle hole axis of the non-circular nozzle hole and intersects with the second virtual plane, forming $$\theta f2=\theta 2+0.5\times P\hat{}0.6$$

as a smallest angle therebetween, in which

θ1 (deg) is the largest nozzle hole open angle of the non-circular nozzle hole,

θ2 (deg) is the smallest nozzle hole open angle,

θf1 (deg) is the largest open angle of a fuel spray injected from the non-circular nozzle hole, and θf2 (deg) is the smallest open angle of the fuel spray injected from the non-circular nozzle hole, and at least two of the nozzle holes of the plurality of nozzle holes, which are adjacent to each other, are formed such that the virtual non-circular cone does not interfere with one of the virtual circular cone and the virtual non-circular cone.

2. A fuel injection valve comprising:

a nozzle that includes a nozzle cylinder portion forming a fuel passage therein, a nozzle bottom portion closing one end of the nozzle cylinder portion, a plurality of nozzle holes connecting a surface of the nozzle bottom portion on a side of the nozzle cylinder portion with a surface on an opposite side from the nozzle cylinder portion to inject fuel in the fuel passage, and an annular valve seat formed around the nozzle holes on the surface of the nozzle bottom portion on the side of the nozzle cylinder portion;

a needle that is reciprocally movable inside the nozzle, the needle configured to contact with the valve seat to close the nozzle holes and to separate from the valve seat to open the nozzle holes; and a drive unit that is configured to move the needle in one of a valve opening direction and a valve closing direction, wherein a nozzle hole of the plurality of nozzle holes includes an inlet opening portion formed on the surface of the nozzle bottom portion on the side of the nozzle cylinder portion, an outlet opening portion formed on the surface of the nozzle bottom portion on the opposite side from the nozzle cylinder portion, and a nozzle hole inner wall connecting the inlet opening portion with the outlet opening portion, an area of the outlet opening portion is larger than an area of the inlet opening portion, the plurality of nozzle holes are non-circular nozzle holes in which a ratio of a longest diameter to a shortest diameter of the outlet opening portion is greater than 1, a virtual non-circular cone is defined as a virtual cone having a vertex, which is an intersection point between the nozzle hole axis of the non-circular nozzle hole and the outlet opening portion, two generatrices, which are in a cross-section along a second virtual plane including the nozzle hole axis of the non-circular nozzle hole, forming $$\theta f1=\theta 1+0.5\times P\hat{}0.6+17\times e\hat{}(-0.13\times\theta 1)$$

as a largest angle therebetween, and two generatrices, which are in a cross-section along a third virtual plane that includes the nozzle hole axis of the non-circular nozzle hole and intersects with the second virtual plane, forming $$\theta f2=\theta 2+0.5\times P\hat{}0.6$$

as a smallest angle therebetween, in which

θ1 (deg) is the largest nozzle hole open angle of the non-circular nozzle hole,

θ2 (deg) is the smallest nozzle hole open angle,

θf1 (deg) is the largest open angle of a fuel spray injected from the non-circular nozzle hole, θf2 (deg) is the smallest open angle of the fuel spray injected from the non-circular nozzle hole, and P (MPa) is an average pressure of the fuel in the fuel passage when the fuel is injected from the circular nozzle hole, and at least two of the nozzle holes of the plurality of nozzle holes, which are adjacent to each other, are formed such that the virtual non-circular cone does not interfere with the virtual non-circular cone.

3. The fuel injection valve according to claim 1, wherein the non-circular nozzle hole is formed such that a short-diameter direction of the outlet opening portion follows an injection direction of the fuel to be injected from the non-circular nozzle hole.

4. The fuel injection valve according to claim 1, wherein at least one non-circular nozzle hole includes the inlet opening portion shaped in a perfect circle and the outlet opening portion shaped by connecting two semicircles, each of which has a same curvature as that of a shape of the inlet opening portion, via lines therebetween.

5. The fuel injection valve according to claim 1, wherein at least one non-circular nozzle hole includes the inlet opening portion and the outlet opening portion each of which is shaped in an ellipse with a same ellipticity.

* * * * *